US011580809B2

(12) United States Patent
Togano et al.

(10) Patent No.: US 11,580,809 B2
(45) Date of Patent: Feb. 14, 2023

(54) DRIVE TRANSMISSION SWITCHING MECHANISM, PAPER SHEET STORAGE UNIT, AND PAPER SHEET PROCESSING DEVICE

(71) Applicant: JAPAN CASH MACHINE CO., LTD., Osaka (JP)

(72) Inventors: Keiichi Togano, Osaka (JP); Shinya Izawa, Osaka (JP)

(73) Assignee: JAPAN CASH MACHINE CO., LTD., Osaka (JP)

( * ) Notice: Subject to any disclaimer, the term of this patent is extended or adjusted under 35 U.S.C. 154(b) by 153 days.

(21) Appl. No.: 17/040,386

(22) PCT Filed: Jan. 9, 2019

(86) PCT No.: PCT/JP2019/000327
§ 371 (c)(1),
(2) Date: Sep. 22, 2020

(87) PCT Pub. No.: WO2019/181148
PCT Pub. Date: Sep. 26, 2019

(65) Prior Publication Data
US 2021/0019974 A1  Jan. 21, 2021

(30) Foreign Application Priority Data
Mar. 23, 2018  (JP) .............................. JP2018-056037

(51) Int. Cl.
*G07D 11/18* (2019.01)
*G07D 11/225* (2019.01)
(Continued)

(52) U.S. Cl.
CPC ........... *G07D 11/18* (2019.01); *B65H 29/006* (2013.01); *B65H 29/58* (2013.01); *G07D 11/225* (2019.01); *B65H 2301/41912* (2013.01)

(58) Field of Classification Search
CPC ........ G07D 11/18; G07D 11/225; G07D 9/00; B65H 29/006; B65H 29/58;
(Continued)

(56) References Cited

U.S. PATENT DOCUMENTS

| 5,971,520 A * | 10/1999 | Nakahara | ............ B41J 2/16523 347/30 |
| 6,334,725 B1 * | 1/2002 | Miyauchi | ............... B41J 23/025 74/435 |

(Continued)

FOREIGN PATENT DOCUMENTS

| CN | 1440544 A | 9/2003 |
| CN | 205942876 U | 2/2017 |

(Continued)

OTHER PUBLICATIONS

WIPO, Japanese International Search Authority, International Search Report and Written Opinion (with English translation) dated Feb. 12, 2019 in International Patent Application No. PCT/JP2019/000327, 8 pages.

(Continued)

Primary Examiner — Jeffrey A Shapiro
(74) Attorney, Agent, or Firm — Masuvalley & Partners; Peter Martinez

(57) ABSTRACT

Provided is a drive transmission switching mechanism that can switch and drive two circulation units by one motor in response to a switching operation of a paper sheet transport direction. A paper sheet storage unit includes a first circulation unit 100 and a second circulation unit 200 that respectively receive transported paper sheets upon reception of a drive force from a single motor 302 and feed paper sheets stored therein, a sorter 310 that sorts paper sheets to either one of the circulation units, and a drive transmission switching mechanism 400 that transmits a drive force from the motor to either one of the circulation units. The drive (Continued)

transmission switching mechanism is activated in conjunction with an operation to change the posture of the sorter, thereby switching and transmitting the drive force to either one of the circulation units.

4 Claims, 13 Drawing Sheets

(51) Int. Cl.
 *B65H 29/00* (2006.01)
 *B65H 29/58* (2006.01)
(58) Field of Classification Search
 CPC .......... B65H 2301/41912; B65H 31/28; B65H 2701/1912; B65H 2515/32; B65H 5/28; B65H 2403/70; B65H 2403/722
 See application file for complete search history.

(56) References Cited

U.S. PATENT DOCUMENTS

| | | | | |
|---|---|---|---|---|
| 7,677,546 | B2* | 3/2010 | Saltsov | G07F 7/04 271/3.14 |
| 10,246,289 | B2* | 4/2019 | Sackfield | G07D 11/12 |
| 2002/0162775 | A1* | 11/2002 | Saltsov | B65H 29/58 209/534 |
| 2004/0124575 | A1* | 7/2004 | Lee | H04N 1/00604 271/10.01 |
| 2010/0100245 | A1* | 4/2010 | Oishi | B65H 29/006 700/275 |
| 2010/0163571 | A1* | 7/2010 | Mizoro | B65H 29/006 221/71 |
| 2014/0090949 | A1* | 4/2014 | Suetaka | B65H 5/28 242/528 |
| 2016/0152426 | A1* | 6/2016 | Hosohara | B65H 3/0669 271/117 |
| 2020/0156892 | A1* | 5/2020 | Fujiwara | B65H 54/2812 |

FOREIGN PATENT DOCUMENTS

| | | |
|---|---|---|
| JP | 2003-525505 A | 8/2003 |
| JP | 2006015685 A | 1/2006 |
| JP | 2014-088240 A | 5/2014 |
| JP | 2016-218965 A | 12/2016 |
| TW | 201020195 A1 | 6/2010 |

OTHER PUBLICATIONS

IN Office Action dated Aug. 13, 2021, in India Patent Application No. 202037040341 (6 pages).

* cited by examiner

DEPOSIT OPERATION

CONFIRMATION OPERATION

FIG.3(a) WITHDRAWAL OPERATION
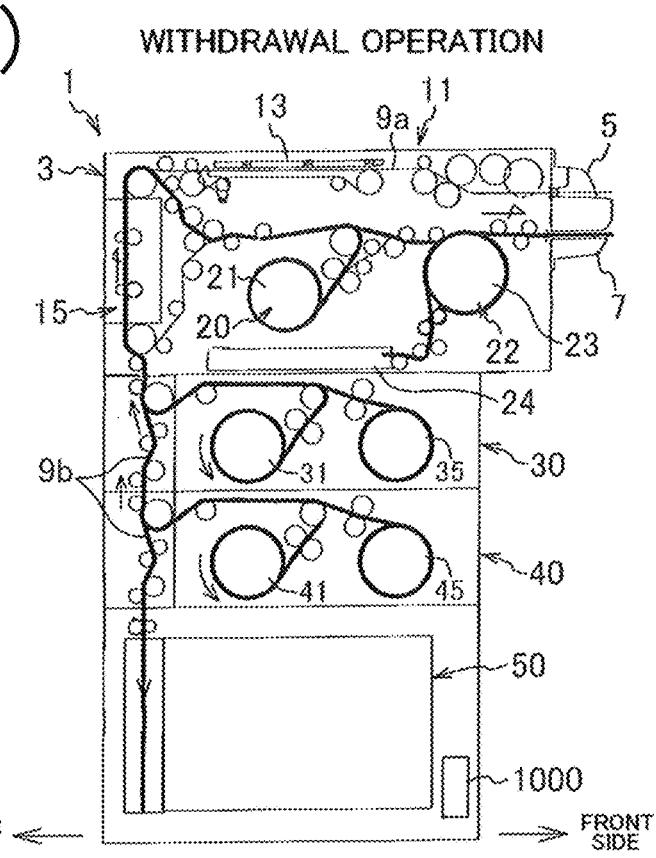
FIG.3(b) COLLECTION OPERATION
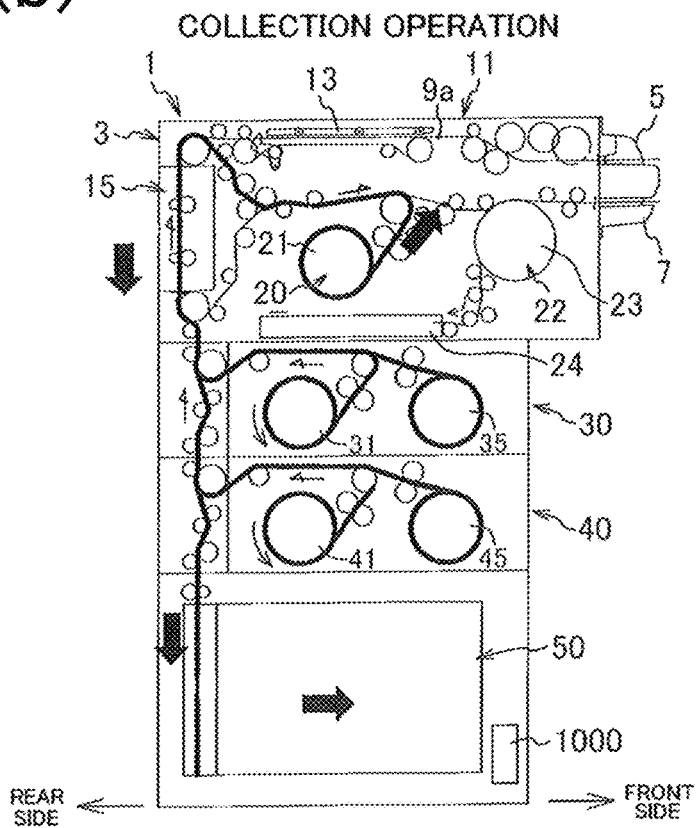

FIG.12(a-1)
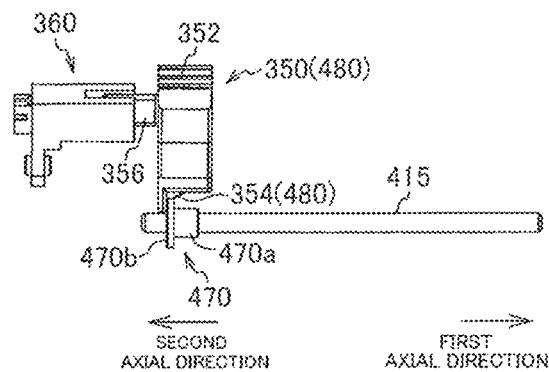
FIG.12(b-1)
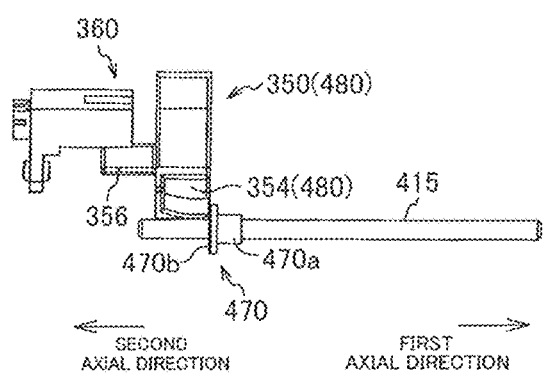
FIG.12(a-2)
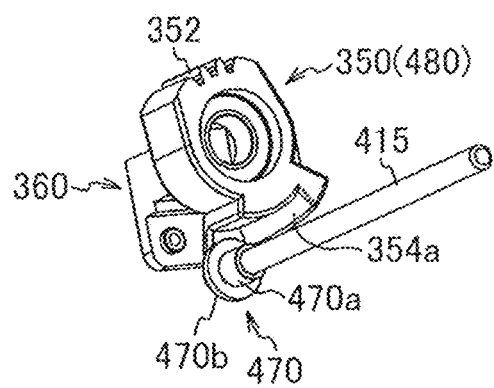
FIG.12(b-2)
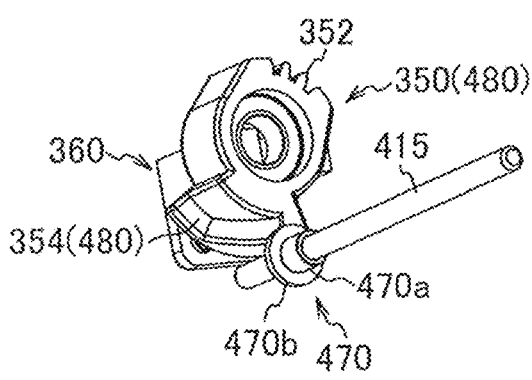
FIG.12(a-3)
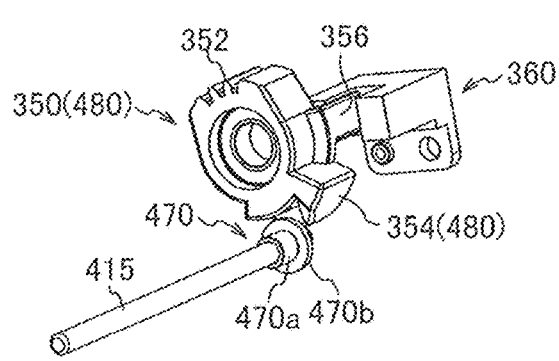
FIG.12(b-3)
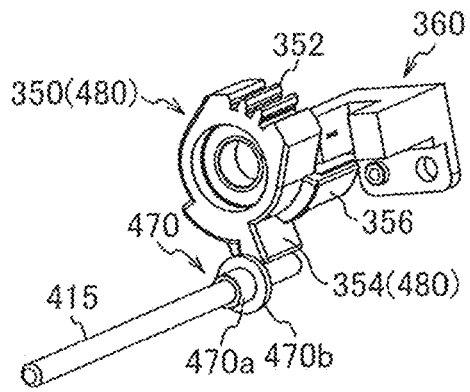

DRIVE TRANSMISSION SWITCHING MECHANISM, PAPER SHEET STORAGE UNIT, AND PAPER SHEET PROCESSING DEVICE

RELATED APPLICATIONS

This application is the U.S. National Phase of and claims priority to International Patent Application No. PCT/JP2019/000327, International Filing Date Jan. 9, 2019, entitled Drive Transmission Switching Mechanism, Paper Sheet Storage Unit, And Paper Sheet Processing Device; which claims priority to Japanese Application No. 2018-056037 filed Mar. 23, 2018; both of which are incorporated herein by reference in their entireties.

FIELD

The present invention relates to a drive transmission switching mechanism that enables to switch and transmit a drive force from one motor to two system loads, and a paper sheet storage unit and a paper sheet processing device that include the drive transmission switching mechanism.

BACKGROUND

As a banknote processing device installed in a banknote handling device such as a vending machine having a function of providing various articles and services by receiving an input banknote, a game-medium lending machine in a game hall, a ticket machine, a cash machine, and a money changer, a circulation-type banknote processing device capable of receiving, storing, and dispensing banknotes of a plurality of denominations has been known.

The circulation-type banknote processing device is provided with a banknote storage unit for storing therein banknotes prepared for payout beforehand and banknotes input during operation by denomination, or in a state of mixed denominations.

There are a circulation-type banknote storage unit having a function of storing banknotes and discharging banknotes to outside as change, and a banknote storage unit for collection (a collection box) that collects all the banknotes in the banknote processing device at the closing time or the like, as the banknote storage unit.

As a configuration of the circulation-type banknote storage unit, such a type has been known in which banknotes are stored between tapes overlapped spirally (helically) and wound around an outer periphery of a circulation drum, like "banknote handling device" disclosed in Patent Literature 1. Further, in the patent literature, there is described a circulation-type banknote storage unit that can store banknotes of different denominations by providing two circulation drums in parallel in one circulation-type banknote storage unit.

However, since it is required to provide a drive motor for each circulation drum, two motors are required in one circulation-type banknote storage unit, thereby causing problems such as an increase in size and weight of each circulation-type banknote storage unit, a decrease in the number of banknotes stacked in each circulation drum, and cost increase.

CITATION LIST

Patent Literature

Patent Literature 1: Japanese Patent Application Laid-open No. 2016-218965

SUMMARY

Technical Problem

The present invention has been achieved in view of the problems described above, and an object of the present invention is to provide a drive transmission switching mechanism that can switch and drive two circulation units by one motor in response to a switching operation of a paper sheet transport direction, a paper sheet storage unit, and a paper sheet processing device.

Solution to Problem

In order to achieve the above object, a paper sheet storage unit according to the present invention comprises: a single motor; a first circulation unit and a second circulation unit that respectively receive transported paper sheets by operating upon reception of a drive force from the motor and feed paper sheets stored therein; a sorter that sorts transported paper sheets to either one of the circulation units by changing a posture thereof; a sorter drive mechanism that drives the sorter; and a drive transmission switching mechanism that selectively switches and transmits the drive force from the motor to either one of the circulation units, wherein the drive transmission switching mechanism is activated in conjunction with an operation of the sorter to change the posture, to switch and transmit the drive force from the motor to either one of the circulation units.

Advantageous Effects of Invention

According to the present invention, it is possible to switch and drive two circulation units by one motor in response to a switching operation of a paper sheet transport direction without making the configuration complicated.

BRIEF DESCRIPTION OF DRAWINGS

FIGS. 3(a) and (b) are explanatory diagrams illustrating a withdrawal operation and a collection operation of the banknote processing device.

FIGS. 12(a-1), (a-2), and (a-3) and (b-1), (b-2), and (b-3) are explanatory diagrams illustrating a state in which the cam gear activates the pressurizing member.

DESCRIPTION OF EMBODIMENTS

Figure 1A:
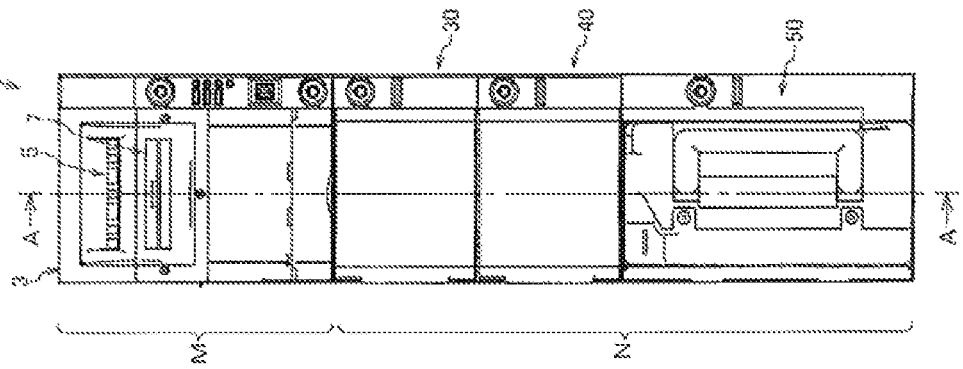
FIGS. 1(a) and (b) are respectively a front elevation and an A-A sectional view of a banknote (paper sheet) processing device including a drive transmission switching mechanism and a paper sheet storage unit according to one embodiment of the present invention.

The present invention will be described below in detail with embodiments illustrated in the drawings.

[Configuration of Banknote Processing Device]

FIGS. 1(a) and (b) are respectively a front elevation and an A-A sectional view of a banknote (paper sheet) processing device including a drive transmission switching mechanism and a paper sheet storage unit according to one embodiment of the present invention.

In the present embodiment, although a device that processes banknotes as an example of paper sheets is described, the drive transmission switching mechanism, the paper sheet storage unit, and the paper sheet processing device according to the present invention can be also applied to a processing device of general paper sheets such as cash vouchers, tickets, and marketable securities, other than banknotes.

Figure 1B:
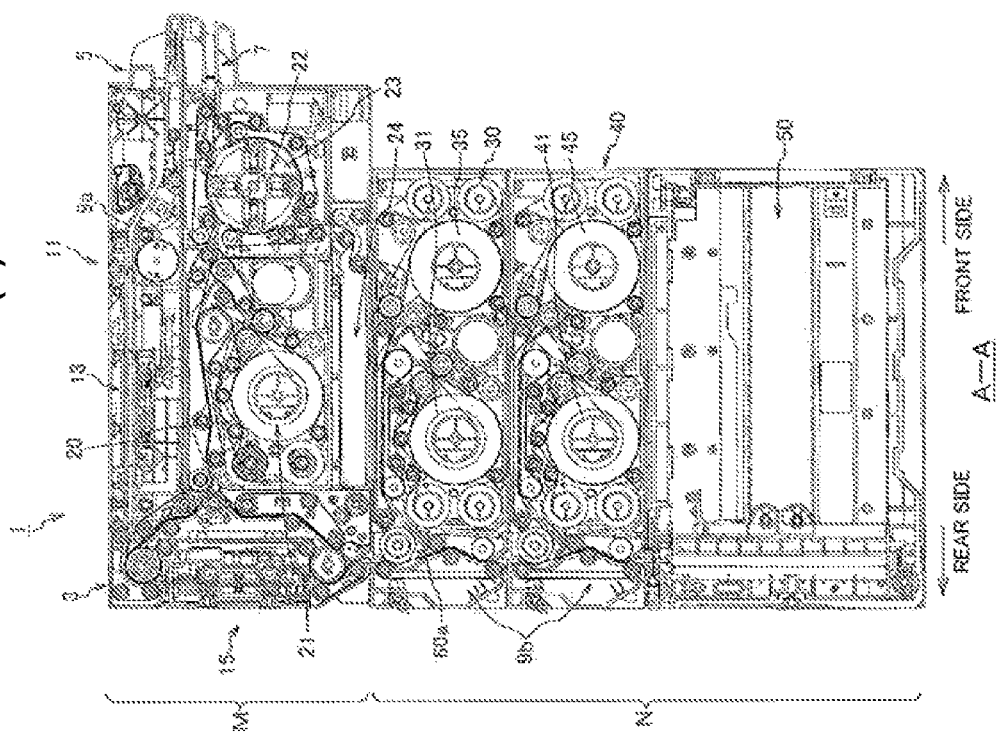

A circulation-type banknote processing device (hereinafter, "banknote processing device") 1 illustrated in FIG. 1 is a unit that is installed in or together with a banknote handling device, for example, a vending machine, a ticket machine, a game-medium lending machine in a game hall, a cash machine, or a money changer, to receive banknotes and dispense banknotes as change or the like.

Figure 2A:
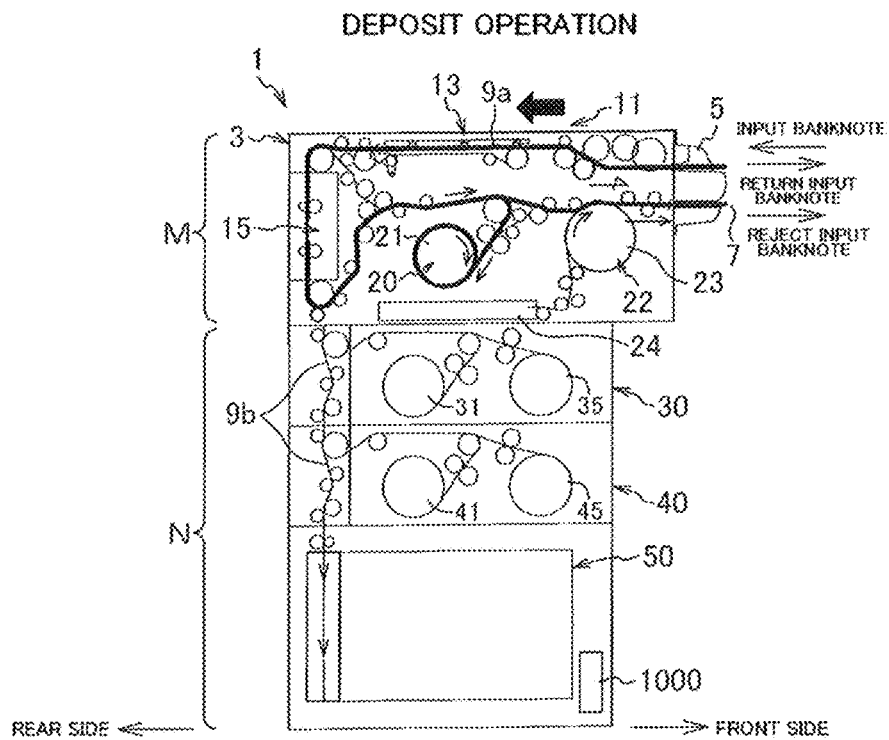
FIGS. 2(a) and (b) are explanatory diagrams illustrating a deposit operation and a confirmation operation of the banknote processing device.
Figure 2B:
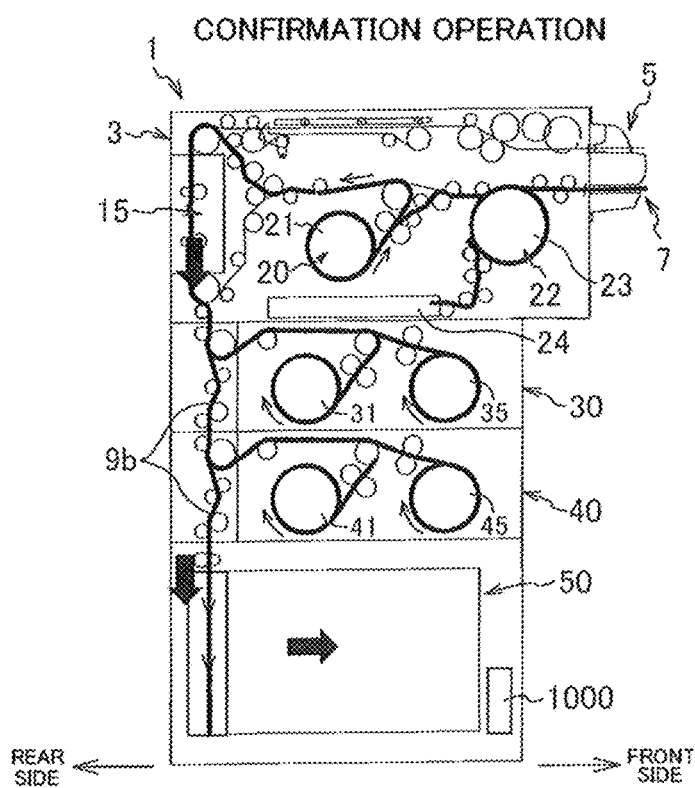

The banknote processing device 1 is schematically constituted by a housing 3 constituting an exterior body, a deposit and withdrawal processing unit M that transports a banknote inserted into the housing in a required route in the machine and discharges a banknote to outside, a banknote storage unit N that stores therein a banknote transported from the deposit and withdrawal processing unit M and transfers banknotes between the deposit and withdrawal processing unit M and the banknote storage unit N, a transport mechanism that transports banknotes through various routes, and a control unit (a CPU, an MPU, a ROM, a RAM, or the like) 1000 that controls various control targets (FIG. 2 and FIG. 3).

The deposit and withdrawal processing unit M includes an input/output port 5 that collectively receives a bundle of banknotes up to 30 sheets including banknotes of different denominations and becomes a return port at the time of returning input banknotes, a return port 7 that becomes a dispensing port of banknotes up to 30 sheets and an input-rejection return port, and a collective deposit unit 11 that separates a bundle of banknotes input and set in the input/output port 5 from each other and introduces each banknote into a device body along a stored-banknote transport route 9a. The deposit and withdrawal processing unit M also includes a centering unit 13 arranged on a downstream side of the collective deposit unit 11 to align the position in a width direction of a transported banknote to the center of a transport route, a recognition unit 15 arranged on a downstream side of the centering unit to judge the denomination and the authenticity of the input banknote by using an optical sensor and a magnetic sensor together, an escrow unit (temporary holding unit) 20 that temporarily holds the input banknotes having passed the recognition unit up to 30 sheets, and after acceptance is confirmed, feeds the banknote to each of a storage unit and a collection box described later, or at the time of cancellation and return due to a return request or the like, feeds the banknote to a payout stacking unit (payout stacking device) 22, and the payout stacking unit (stacking device of returned banknotes) 22 that once stacks banknotes to be returned or rejected banknotes transported from the escrow unit (hereinafter, "returned banknote"), and then discharges the banknotes to the return port 7. Further, the deposit and withdrawal processing unit M includes a forgotten-banknote storage unit (banknote holding unit) 24 in which, when a returned banknote paid out from the payout stacking unit 22 to the return port 7 is not collected by a customer even after a predetermined time has passed, the banknote is transported in a reverse direction by the payout stacking unit and stored therein as a forgotten banknote.

The banknote storage unit N includes first and second circulation-type banknote storage units (circulation-type banknote storage devices) 30 and 40 that accommodate banknotes fed from the escrow unit 20 one by one when acceptance of the input banknotes is confirmed, and transported on the stored-banknote transport routes 9a and 9b for each denomination so that the banknotes can be taken in and out, and a collection box (collected-banknote storage unit) 50 detachably attached into an accommodation space provided below the second circulation-type banknote storage unit 40 from a front side, to collect all denominations of banknotes from each circulation-type banknote storage unit at the closing time or the like, and collect high-denomination banknotes that are not used as change and excessive banknotes that cannot be accommodated in each circulation-type banknote storage unit.

The transport mechanism includes a motor, a solenoid, and a pulley for generating and transmitting a drive force for transporting banknotes along the respective transport routes 9a and 9b and other transport routes, a belt, a gate, and the like.

A control unit 1000 controls control targets such as the deposit and withdrawal processing unit M, the banknote storage unit N, the transport mechanism, and the like.

The maximum number of banknotes to be handled in the input/output port 5 and the return port 7 is only an example.

The first and second circulation-type banknote storage units 30 and 40 in the present example respectively include two circulation drums (31, 35, 41, and 45) respectively having the maximum storage number of 60 sheets. The respective circulation drums 31, 35, 41, and 45 are of a type suitable for circulation in which a banknote is stored between two long tapes (long films) overlapped and spirally (helically) wound around respective outer peripheries of these drums.

Since the first and second circulation-type banknote storage units 30 and 40 include a drive transmission switching mechanism 400 according to the present invention described later, the first and second circulation-type banknote storage units 30 and 40 can respectively drive the two circulation drums 31 and 35, and the two circulation drums 41 and 45 by a single motor.

[Various Operations of Banknote Processing Device]

Next, an outline of a deposit operation, a confirmation operation, a withdrawal operation, and a collection operation in the banknote processing device 1 including the drive transmission switching mechanism according to the present invention illustrated in FIG. 1 is described with reference to FIG. 2 and FIG. 3.

That is, FIGS. 2(*a*) and (*b*) are explanatory diagrams illustrating the deposit operation and the confirmation operation of the banknote processing device, and FIGS. 3(*a*) and (*b*) are explanatory diagrams illustrating the withdrawal operation and the collection operation of the banknote processing device.

First, in the deposit operation in FIG. 2(*a*), when one or a plurality of sheets of banknotes are input from the input/output port 5, upon reception of a signal from a sensor having detected the banknote, the control unit 1000 activates the transport mechanism to take in the banknotes by using the collective deposit unit 11 and the input-banknote transport route 9*a*. The collective deposit unit 11 extracts the banknote one by one from the uppermost banknote in the bundle of banknotes set in the input/output port 5, and transports the extracted banknote to the centering unit 13. The banknote transported to the centering unit is subjected to centering and is then moved to the recognition unit 15 to be recognized. The banknote judged to be acceptable by the recognition unit 15 is transported to the escrow unit 20, in which the banknotes are wound one by one around an outer periphery of an escrow drum 21 and temporarily held, to wait for confirmation of the deposit. If a rejected banknote, which is judged to be unacceptable in the recognition unit, is a banknote input one by one from the input/output port 5, the banknote is directly discharged to outside from the return port 7. Meanwhile, when a plurality of banknotes collectively input are rejected, the banknotes are once stacked (one to plural sheets) in the payout stacking unit 22, and then are discharged to outside and returned collectively from the return port 7. Further, when a customer requests return of banknotes by operating a cancel button (not illustrated), the banknotes temporarily held in the escrow unit 20 are fed to the payout stacking unit 22 one by one, overlapped one by one and wound on an outer periphery of a rotating payout drum 23, and are stacked in a laminated state. When stacking of all the banknotes input by the customer on the outer periphery of the payout drum is completed, the payout drum 23 rotates in a payout direction, to cause the bundle of banknotes to project outside and be returned from the return port 7, thereby prompting the customer to receive the banknotes.

If the bundle of banknotes projected to outside for return from the return port 7 are not collected by the customer even after a predetermined time has passed, the payout drum is reversely rotated in a return direction to transport the banknotes into the machine, and stored as forgotten banknotes in the forgotten-banknote storage unit 24.

In the confirmation operation in FIG. 2(*b*), when deposit of the input banknotes temporarily held in the escrow unit 20 is confirmed, the banknotes are fed out one by one from the escrow unit, and banknotes to be used as change are stored in either one of the circulation-type banknote storage units 30 and 40 by denomination via the stored-banknote transport route 9*b*, and banknotes not to be used as change are stored in the collection box 50.

In the withdrawal operation in FIG. 3(*a*), banknotes stored in the circulation-type banknote storage units 30 and 40 are extracted and recognized in the recognition unit 15 at the time of dispensing the banknote as change, and if the banknote is a banknote capable of being returned, the banknote is once stacked (one to plural sheets) in the payout stacking unit 22, and paid out collectively as change from the return port 7.

On the other hand, when it is judged that the banknote is a banknote that cannot be returned by the recognition of the recognition unit 15, the banknote is temporarily held in the escrow unit 20, and then transferred to the collection box 50 to be stored therein.

In the collection operation in FIG. 3(*b*), the banknotes stored in the circulation-type banknote storage units (circulation-type banknote storage devices) 30 and 40 at the closing time are once stacked in the escrow unit 20, and then stored in the collection box 50.

[Drive Transmission Switching Mechanism and Circulation-Type Banknote (Paper Sheet) Storage Unit]

<Banknote Storage Unit>

Figure 4:
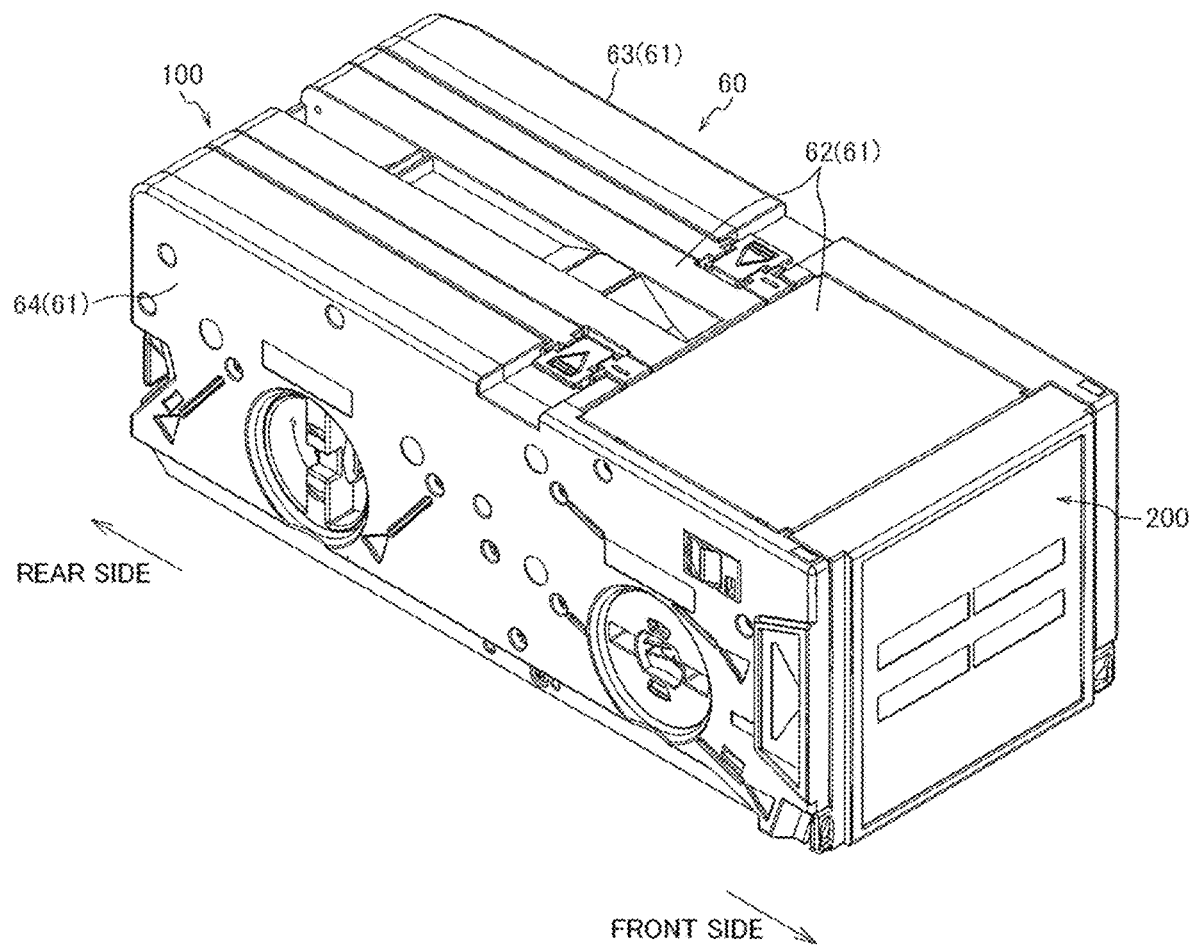
FIG. 4 is an external perspective view of a circulation-type banknote storage unit including the drive transmission switching mechanism according to the embodiment of the present invention.
Figure 5:
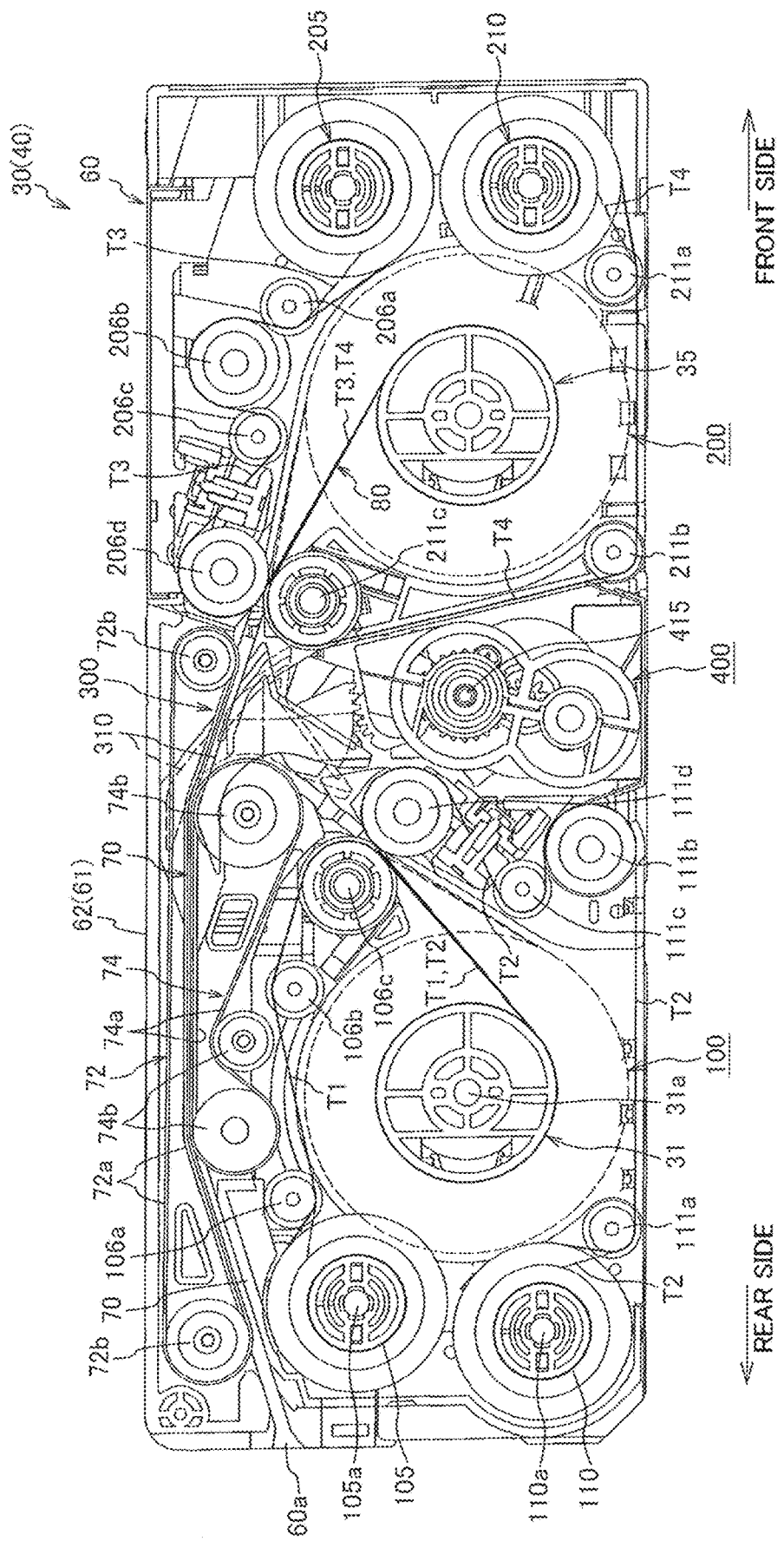
FIG. 5 is a longitudinal sectional view illustrating an inner configuration of the circulation-type banknote storage unit.
Figure 6:
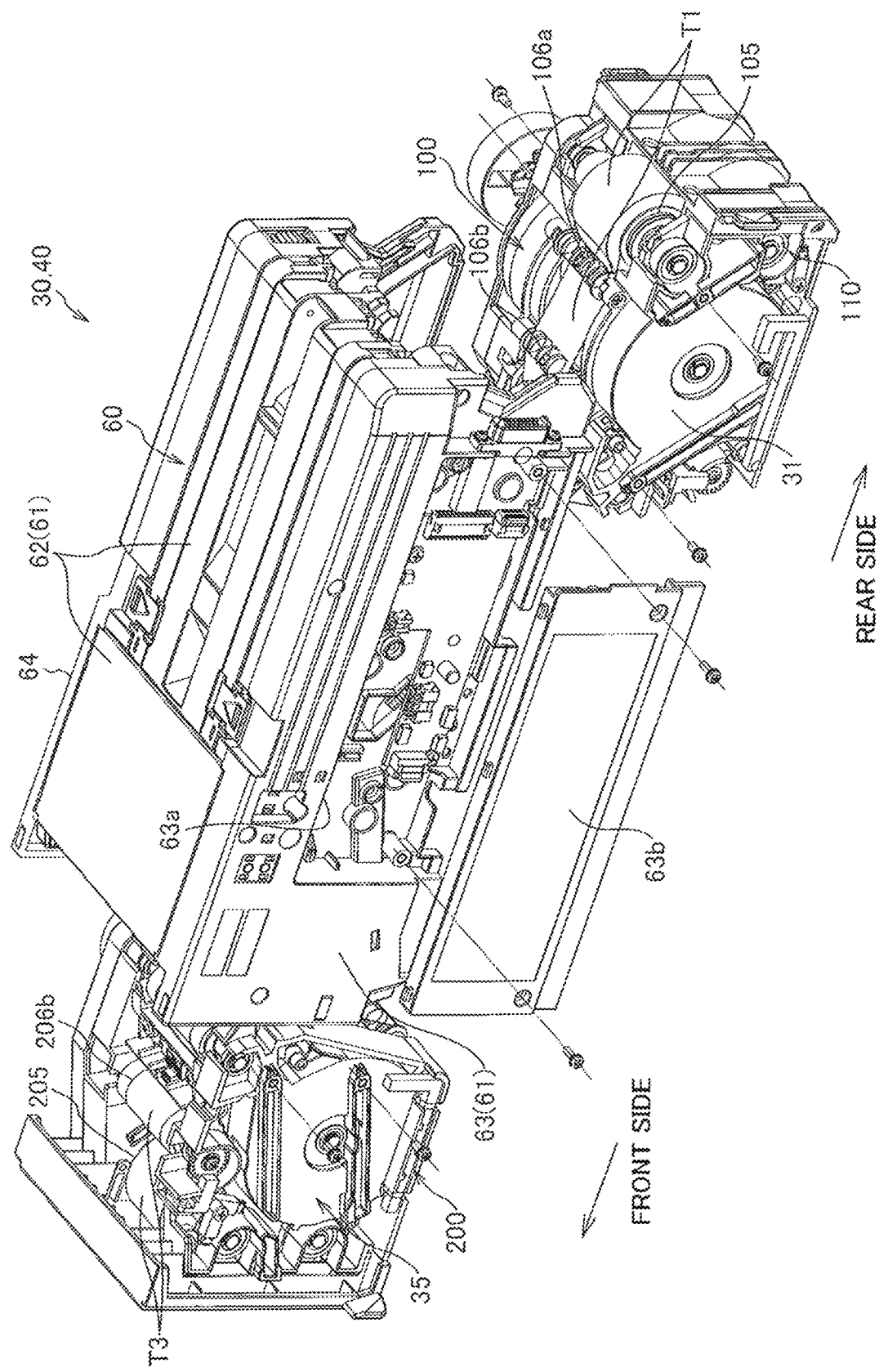
FIG. 6 is an exploded perspective view of the circulation-type banknote storage unit.
Figure 7:
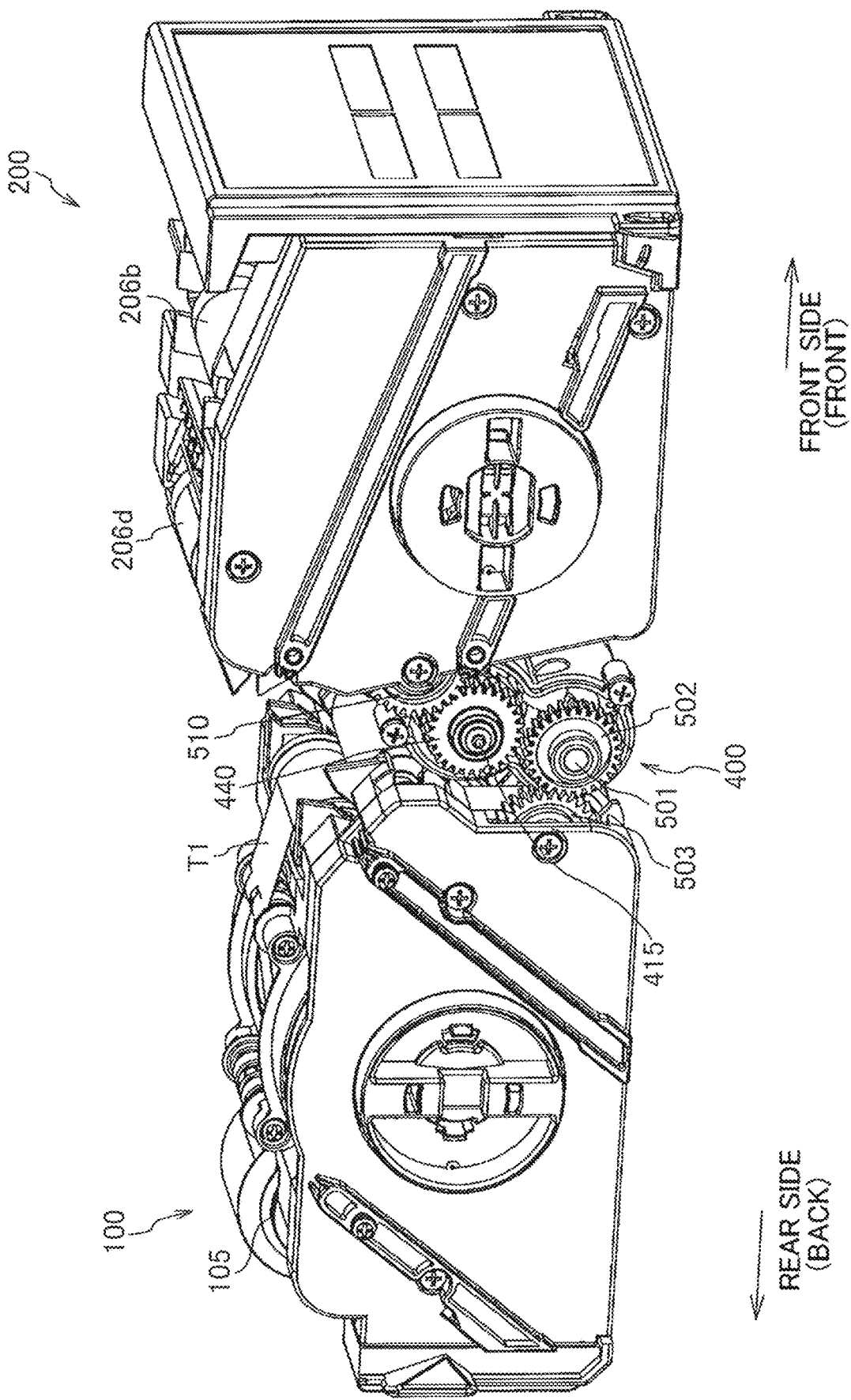
FIG. 7 is a perspective view illustrating an assembly state of two circulation drum units and the drive transmission switching mechanism.
Figure 8:
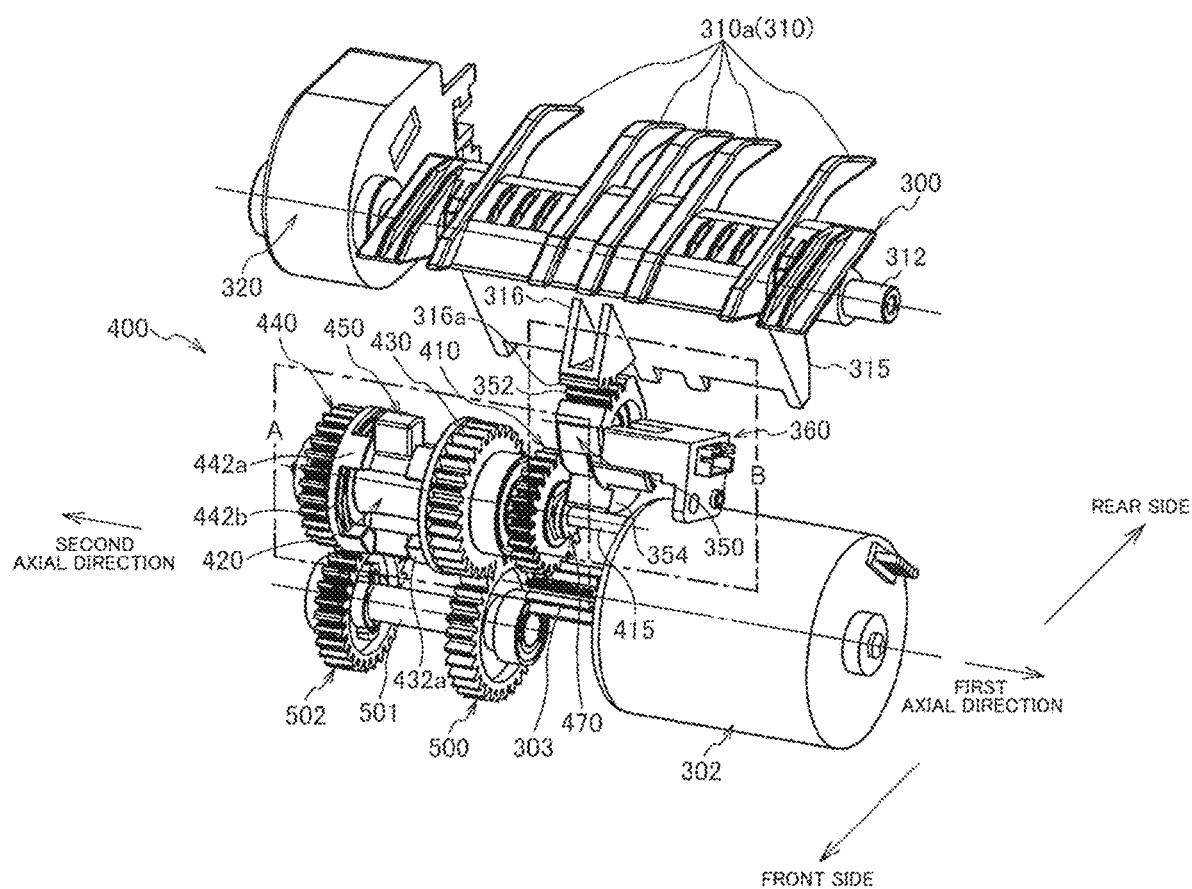
FIG. 8 is an external perspective view of a flapper drive mechanism and the drive transmission switching mechanism.
Figure 9:
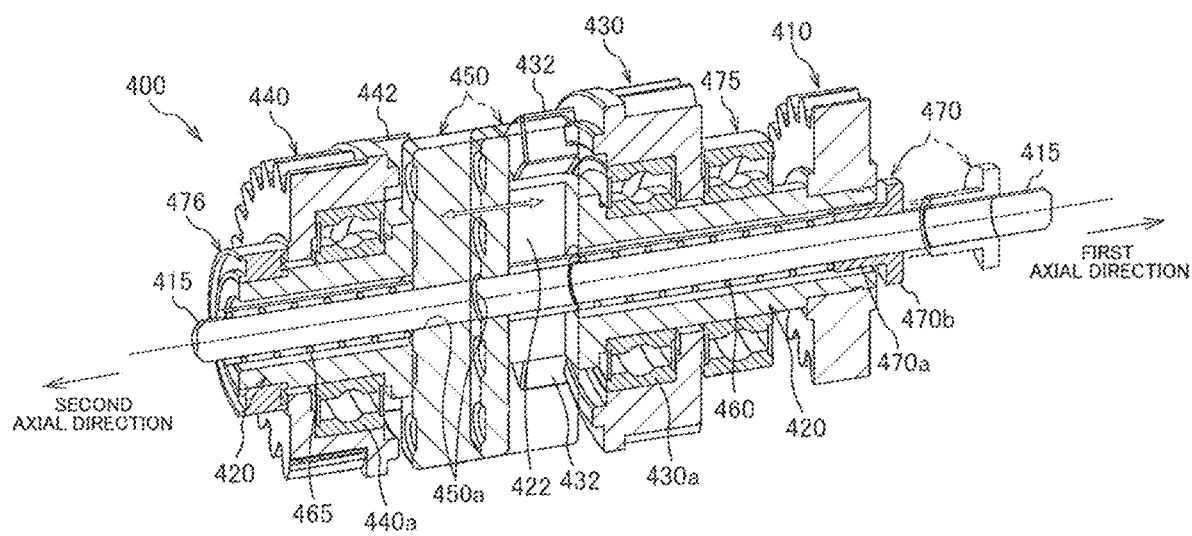
FIG. 9 is a longitudinal sectional view of the drive transmission switching mechanism (a sectional view of a part A in FIG. 8).
Figure 10:
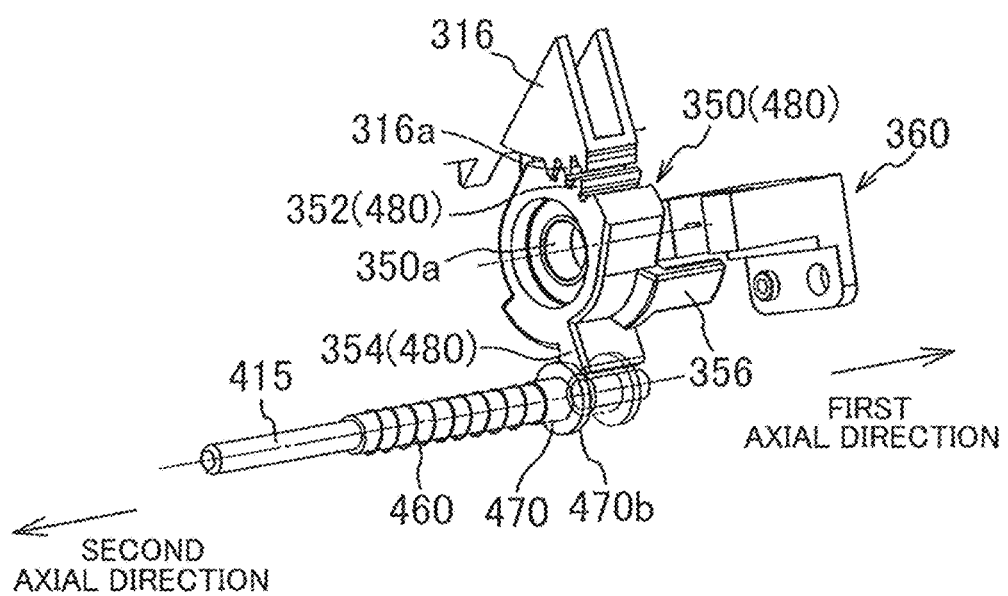
FIG. 10 is a perspective view illustrating an assembly state of a chipped gear member, a cam gear, a pressurizing member, and the like (an enlarged view of a part B in FIG. 8).
Figure 11:
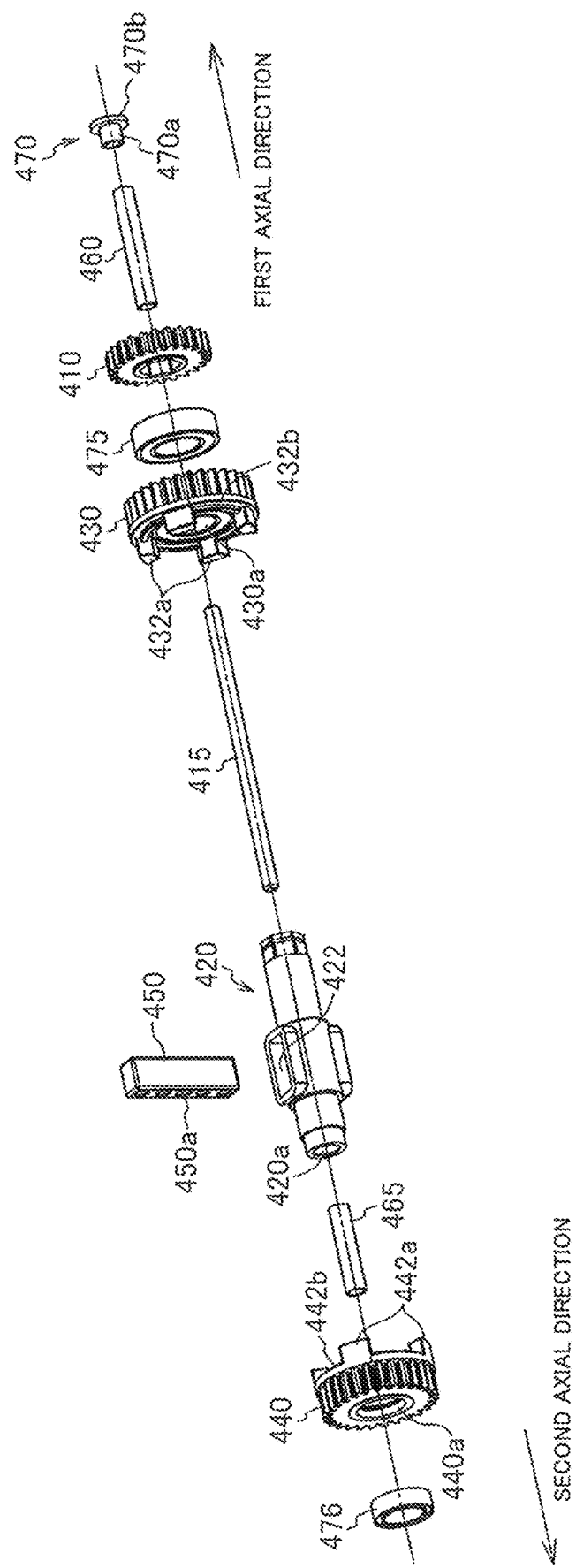
FIG. 11 is an exploded perspective view of the main component of the drive transmission switching mechanism.

FIG. 4 is an external perspective view of the circulation-type banknote storage unit including the drive transmission switching mechanism according to the embodiment of the present invention. FIG. 5 is a longitudinal sectional view illustrating an inner configuration of the circulation-type banknote storage unit, and FIG. 6 is an exploded perspective view of the circulation-type banknote storage unit. FIG. 7 is a perspective view illustrating an assembly state of two circulation drum units and the drive transmission switching mechanism. FIG. 8 is an external perspective view of a flapper drive mechanism and the drive transmission switching mechanism. FIG. 9 is a longitudinal sectional view of the drive transmission switching mechanism (a sectional view of a part A in FIG. 8). FIG. 10 is a perspective view illustrating an assembly state of a chipped gear member, a cam gear, a pressurizing member, and the like (an enlarged view of a part B in FIG. 8). FIG. 11 is an exploded perspective view of the main component of the drive transmission switching mechanism. FIGS. 12(*a*-1), (*a*-2), and (*a*-3) and (*b*-1), (*b*-2), and (*b*-3) are explanatory diagrams illustrating a state in which the cam gear activates the pressurizing member.

(Circulation-Type Banknote Storage Unit)

The circulation-type banknote storage units (circulation-type banknote storage devices=banknote storage units) 30 and 40 have a schematic configuration including two circulation drum units 100 and 200 in a casing 60, a flapper drive mechanism 300 that switches the transport route of the banknote (feed route, payout route) to either one of the circulation drum units, and the drive transmission switching mechanism 400 that switches and transmits a drive force from a motor alternatively (selectively) to either one of the circulation drum units, in conjunction with a switching operation of a banknote transport direction by the flapper drive mechanism 300.

The circulation-type paper sheet storage units 30 and 40 according to the present invention include a single motor 302, a first circulation unit (first circulation drum unit) 100 and a second circulation unit (second circulation drum unit) 200 that respectively receive transported paper sheets by operating upon reception of a drive force from the motor and feed paper sheets stored therein, a sorter (flapper) 310 that sorts transported paper sheets to either one of the circulation units by changing a posture (position) thereof, a sorter drive mechanism (flapper drive mechanism) 300 that drives the sorter, and the drive transmission switching mechanism 400 that selectively switches and transmits a drive force from the motor to either one of the circulation units, by operating in conjunction with a sorting operation by the sorter drive mechanism 300. The configuration is characterized such that the drive transmission switching mechanism is activated by changing the posture (transport direction) of the sorter 310 by the sorter drive mechanism, to switch and transmit the drive force from the motor to either one of the circulation units.

The configuration of the circulation-type banknote storage units (circulation-type banknote storage devices) 30 and 40 is described below in detail.

As illustrated in FIG. 6, the casing 60 includes a casing body 61 having a top panel 62 and right and left side plates 63 and 64, and a side plate lid 63b attached to an opened portion 63a of the side plate 63. The casing 60 is constituted so that the respective circulation drum units 100 and 200 can be attached thereto from each opening portion on a rear side and a front side of the casing body 61. A feed port 60a for receiving a banknote transported from the deposit and withdrawal processing unit M toward the banknote storage unit N on the stored-banknote transport routes 9a and 9b is formed in an upper part of the rear side of the casing 60.

The respective circulation-type banknote storage units 30 and 40 have substantially the same configuration, and thus the circulation-type banknote storage unit 30 is mainly described below. The circulation drum unit is described below as an example of an object to be driven by the motor. However, the object to be driven widely includes not only a circulation unit of a drum and tape type, but also other circulation units.

As illustrated in FIG. 5 and FIG. 7, the flapper drive mechanism 300 and the drive transmission switching mechanism 400 are arranged between the circulation drum units 100 and 200, and it is configured to switch the transmission direction of a drive force from the motor to either one of the circulation units, in conjunction with the switching operation of the transport direction by the flapper.

As illustrated in FIG. 5, the circulation drum unit 100 on the rear side includes a feed route (transport route) 70 formed in an upper part in the casing to transport banknotes fed from the feed port 60a into the casing, a transport mechanism 72 (a belt 72a and rollers 72b) respectively arranged on an upper side and a lower side of the feed route 70, and a transport mechanism 74 (a belt 74a and rollers 74b). The circulation drum unit 100 also includes a rear-side circulation drum (first circulation drum) 31 that winds tapes (films) T1 and T2 on the rear side around a periphery thereof in an overlapped state on each other at the time of rotation in a clockwise direction by fixing one end of both the tapes T1 and T2, a first bobbin 105 capable of performing forward and reverse rotation to spirally wind (in multiple layers) and hold the first tape T1 to be supplied to the outer periphery of the first circulation drum 31, and guide rollers 106a to 106c that guide the first tape T1 pulled out from the first bobbin toward the outer periphery of the first circulation drum. The circulation drum unit 100 further includes a second bobbin 110 capable of performing forward and reverse rotation to spirally wind and hold the second tape T2 to be supplied to the outer periphery of the first circulation drum 31, and guide rollers 111a to 111d that guide the second tape T2 pulled out from the second bobbin toward the outer periphery of the first circulation drum. The respective tapes T1 and T2 are respectively wound around the outer periphery of the first circulation drum through routes along the respective guide rollers 106a to 106c and 111a to 111d, and fed from the first circulation drum to the respective bobbins 105 and 110.

The banknotes fed from the feed port 60a and transported through the feed route 70 toward the first circulation drum by the transport mechanisms 72 and 74 are fed into a contact travel area in which both the tapes T1 and T2 are overlapped on each other and travel, in a nip portion between the guide roller 106c and the guide roller 111d at the final position, and stacked on the outer periphery of the first circulation drum that rotates in a winding direction (clockwise direction), while being held between the both tapes.

When the banknotes stacked between the tapes on the outer periphery of the first circulation drum 31 are to be discharged one by one to outside of the circulation drum unit 100, by rotating the respective bobbins 105 and 110 in a winding direction (counter-clockwise direction), while rotating the first circulation drum in a feeding direction (counter-clockwise direction), the respective tapes T1 and T2 are fed in a reverse direction in the same route as that at the time of feeding from the respective bobbins 105 and 110 and wound around the respective bobbins, and the banknotes placed between the respective tapes are sequentially fed out from the nip portion to the feed route 70 and the feed port 60a.

The final guide roller 106c for the first tape T1 and the final guide roller 111d for the second tape T2 form the nip portion, and after the nip portion, both the tapes T1 and T2 are wound around the outer periphery of the first circulation drum 31 in an overlapped state on each other. Further, when the flapper (sorter) 310 for switching the transport direction, which is arranged in the banknote transport route at an intermediate position between the both circulation drum units 100 and 200, is in a first posture (at a first position) indicated by a broken line, by guiding the banknote transported in the feed route 70 in the front direction to the nip portion between the final guide roller 106c and the final guide roller 111d, the banknote is wound around the outer periphery of the first circulation drum 31 rotating in a clockwise direction in a state being placed between the both tapes T1 and T2 in the nip portion.

On the other hand, when the flapper 310 is in a second posture (at a second position) indicated by a solid line, a bifurcation portion from an end portion of the feed route 70 toward a feed route 80 on the front side (to be formed between tapes T3 and T4) is opened. Therefore, the banknote is transported to the feed route 80.

The circulation drum unit 200 on the front side includes the front-side feed route 80 that is continuous from the end portion of the feed route 70 (the contact travel area of the belts 72a and 74a), the circulation drum (second circulation drum) 35 on the front side that winds the both tapes T3 and T4 in a state overlapped on each other around a periphery thereof at the time of rotating in a clockwise direction by fixing one end of the both tapes T3 and T4 on the front side, a third bobbin 205 capable of performing forward and reverse rotation to wind and hold the third tape T3 to be supplied to the outer periphery of the second circulation drum 35, guide rollers 206a to 206d that guide the third tape T3 pulled out from the third bobbin toward the outer periphery of the second circulation drum, a fourth bobbin 210 capable of performing forward and reverse rotation to wind and hold the fourth tape T4 to be supplied to the outer periphery of the second circulation drum 35, and guide rollers 211a to 211c that guide the fourth tape T4 pulled out from the second bobbin toward the outer periphery of the second circulation drum.

The respective tapes T3 and T4 are wound around the outer periphery of the second circulation drum 35 through routes along the respective guide rollers 206a to 206d and 211a to 211c, and fed from the second circulation drum to the respective bobbins 205 and 210.

Banknotes fed from the feed port 60a and transported toward the bifurcation portion where the flapper 310 is located, through the feed route 70 by the transport mechanisms 72 and 74 are guided to the feed route (transport route) 80 on the front side, when the flapper is in the second posture indicated by the solid line.

The feed route 80 is a route from the nip portion between the guide roller 206c and the guide roller 211d at the final positions to the outer periphery of the second circulation drum 35, and is constituted by the contact travel area in which the both tapes T3 and T4 overlap on each other and travel. The banknote having passed the bifurcation portion is fed into the feed route 80, and is stacked on the outer periphery of the second circulation drum that rotates in a winding direction (clockwise direction), while being placed between the both tapes.

When the banknotes stacked between the tapes T3 and T4 on the outer periphery of the second circulation drum 35 are to be discharged one by one to outside of the circulation drum unit 100, by rotating the respective bobbins 205 and 210 in a winding direction (counter-clockwise direction), while rotating the second circulation drum in a feeding direction (counter-clockwise direction), the respective tapes T3 and T4 are fed in a reverse direction in the same route as that at the time of feeding from the respective bobbins 205 and 210 and wound around the respective bobbins, and the banknotes placed between the respective tapes are sequentially fed out from the nip portion to the feed routes 80 and 70 and the feed port 60a.

The final guide roller 206d for the third tape T3 and the final guide roller 211c for the fourth tape T4 form the nip portion, and after the nip portion, the both tapes T3 and T4 are wound around the outer periphery of the second circulation drum 35 in an overlapped state on each other. That is, when the flapper 310 for switching the transport direction, which is arranged in the banknote transport route at an intermediate position between the both circulation drum units 100 and 200, is in a second posture indicated by a solid line, by guiding the banknote transported in the feed route 70 to the nip portion between the final guide roller 206d and the final guide roller 211c, the banknote is wound around the outer periphery of the second circulation drum 35 rotating in a clockwise direction in a state being placed between the both tapes T3 and T4 in the nip portion. When the banknote on the outer periphery of the second circulation drum is to be fed out, reverse feed of the banknote is performed in a state of maintaining the flapper in the second posture.

(Sorter Drive Mechanism)

Next, in an overall external perspective view of the flapper drive mechanism and the drive transmission switching mechanism in FIG. 8, a reference numeral 300 denotes the flapper drive mechanism (sorter drive mechanism) that moves the flapper (sorter) 310 for switching the transport direction rotationally in forward and reverse directions within a predetermined angle range, in the present example, in an angle range of 20 degrees. The flapper 310 includes a plurality of claws 310a fixed to a pivot shaft 312 and integrally move rotationally together with the pivot shaft. The claws enter into a gap between the respective transport belts 72a and 74a constituted by a plurality of belts arranged in parallel with a predetermined gap, thereby enabling to change the posture between the first posture and the second posture and switch the transport direction of the banknote.

The pivot shaft 312 is supported by a swing solenoid 320 at one end to move the flapper 310 rotationally. On one surface of a protruding piece 315 protruding to an opposite side to the flapper 310, having the pivot shaft 312 therebetween, a clutch activating piece (chipped gear member) 316 having sides each formed by a triangular plate material is provided in a protruding manner, and a gear portion 316a having a small number of gear threads is formed on a lower surface of the clutch activating piece.

As illustrated in a relevant-part enlarged diagram in FIG. 10, immediately below the clutch activating piece 316, a cam gear 350 that moves rotationally around a shaft portion 350a parallel to the pivot shaft 312 of the flapper is arranged so as to be able to move rotationally. The cam gear 350 includes a driven gear portion 352 that engages with the gear portion 316a of the clutch activating piece, a cam portion 354, and a douser 356 on the periphery thereof. Since the flapper 310 moves rotationally by the swing solenoid 320, the drive force is transmitted from the gear portion 316a of the clutch activating piece to the driven gear portion 352, and the cam gear 350 moves rotationally. The cam portion 354 provided in a protruding manner on the opposite side to the driven gear portion 352 moves rotationally in forward and reverse directions to advance and retreat a pressurizing member 470 described later in an axial direction, thereby switching the transmission direction of the drive force by the drive transmission switching mechanism 400 to the rear-side circulation drum unit 100 and the front-side circulation drum unit 200 alternately.

The douser 356 advances and retreats between a light-emitting element and a light-receiving element constituting a route-switching detection sensor 360 formed of a photo interrupter, and when located between these elements, transmits a signal indicating that the flapper is at a home position (at a first axial position) to a control unit. In the state in FIG. 10, since the flapper and the cam portion 354 are in the second posture, the douser 356 is not located between the elements, and the pressurizing member 470 is at a second axial position indicated by a solid line. When the flapper moves rotationally to shift to the first posture and the cam portion 354 moves rotationally from the posture in FIG. 10 by a predetermined angle in a counter-clockwise direction, the douser enters into between the elements to become a light-shielded state. Therefore, the pressurizing member moves to the first axial position indicated by a chain line.

The control unit can confirm in which state of the first posture and the second posture the flapper 310 is, by detecting the posture of the cam gear 350 by the route-switching detection sensor 360.

(Drive Transmission Switching Mechanism)

The drive transmission switching mechanism 400 is a unit that switches and transmits a drive force from a single motor 302 alternatively (selectively) to either one of the circulation drum unit (first load) 100 on the rear side and the circulation drum unit (second load) 200 on the front side. The respective circulation drum units include a drive mechanism formed of a gear and the like, and by activating the respective drive mechanisms by the drive force from the drive transmission switching mechanism 400, the circulation drums, the bobbins, and the transport mechanisms are rotated by the single motor, thereby realizing winding and feed of the banknote.

The drive transmission switching mechanism 400 operates in conjunction with the flapper drive mechanism 300, and when the flapper (sorter) 310 is closing the front-side feed route 80, transmits the drive force from the motor 302 only to the circulation drum unit (first load) 100 on the rear side, and when the flapper 310 is opening the front-side feed route 80, transmits the drive force from the motor 302 only to the circulation drum unit (second load) 200 on the front side.

As illustrated in FIG. 8, FIG. 9, and FIG. 11, the drive transmission switching mechanism 400 includes a main drive gear 410 driven to be rotated upon reception of a drive force from an output gear 303 of the motor 302, a fixed shaft 415 that does not rotate and pivotally supports a shaft hole of the main drive gear so as to be able to rotate via a rotary sleeve 420, and the rotary sleeve 420 being a long cylindrical body that is supported immovably in an axial direction but so as to be able to rotate relative to an outer periphery of a fixed shaft inserted into a central hole 420a penetrating in an axial direction, and fixedly supports a shaft hole of the main drive gear 410. The drive transmission switching mechanism 400 further includes a first transmission gear 430 in which a shaft hole (a shaft core, a bearing member 430a) is pivotally supported so as to be able to rotate relative to an outer periphery of the rotary sleeve 420 on the second axial direction side (the left side in each drawing) of the main drive gear 410, to transmit the drive force to the circulation drum unit 100 (first load) side on the rear side, a second transmission gear 440 in which a shaft hole (a bearing member 440a) is pivotally supported so as to be able to rotate relative to an outer periphery of the rotary sleeve 420 on the second axial direction side of the first transmission gear, to transmit the drive force to the circulation drum unit 200 (second load) side on the front side, and first dog teeth 432 and second dog teeth 442 provided on opposite surfaces of the first transmission gear 430 and the second transmission gear 440.

The respective dog teeth 432 and 442 are respectively constituted by peaks 432a and 442a, and valleys 432b and 442b.

Further, the drive transmission switching mechanism 400 includes a dog clutch key 450 that is supported axially movably by a movable support hole 422 provided in a rotary sleeve portion located between the first transmission gear 430 and the second transmission gear 440 and meshes with the first dog teeth 432 when located at a position biased toward the first axial direction, and meshes with the second dog teeth 442 when located at a position biased toward the second axial direction. The drive transmission switching mechanism 400 also includes a first coil spring (first resilient member) 460 constituted by a compression spring arranged between an outer periphery of the fixed shaft 415 and an inner periphery of the central hole 420a of the rotary sleeve 420 at a position closer to the first transmission gear 430 than the dog clutch key (first axial direction side), and a second coil spring (second resilient member) 465 constituted by a compression spring arranged between the outer periphery of the fixed shaft 415 and the inner periphery of the central hole 420a of the rotary sleeve at a position closer to the second transmission gear 440 than the dog clutch key (second axial direction side). The drive transmission switching mechanism 400 further includes the pressurizing member (slide bush) 470 inserted into a gap between the outer periphery of the fixed shaft and the central hole 420a of the rotary sleeve from an end on the second axial direction side to pressurize the dog clutch key 450 toward the second transmission gear 440 via the first coil spring.

It is set that the resilience (spring load) of the second coil spring 465 becomes larger than that of the first coil spring 460. Since the second coil spring 465 is configured not to move in the second axial direction by being locked by a locking unit (not illustrated) at the end on the second axial direction side, the second coil spring 465 is reliably compressed at the time of being pressurized in the second axial direction by the dog clutch key. Further, an axial length and an arrangement position of the first coil spring are set so as not to block the behavior of the dog clutch key, as indicated by a chain line in FIG. 9, when the second coil spring shifts the dog clutch key 450 to an end in the first axial direction in the movable support hole. Meanwhile, the axial length and the resilience of the first coil spring are set so that the first coil spring can cause the dog clutch key to mesh with the second dog teeth 442 of the second transmission gear, while sufficiently compressing the second coil spring via the dog clutch key, when the pressuring member compresses the first coil spring in the second axial direction.

When the pressuring member 470 is not pressing the first coil spring 460 or is pressing the first coil spring 460 with a weaker force than a predetermined value, the dog clutch key 450 is pressed in the first axial direction by the second coil spring 465, so as to be meshed with the first dog teeth (valleys) of the first transmission gear 430, thereby transmitting the drive force from the main drive gear 410 to the circulation drum unit 100 on the rear side. Further, when the flapper drive mechanism 300 operates to activate the activation mechanism (the cam gear 350), so that the pressurizing member 470 presses the first coil spring 460 in the second axial direction with a force equal to or larger than a predetermined value, the dog clutch key 450 moves in the second axial direction so as to be meshed with the second dog teeth 442 (valleys) of the second transmission gear 440, thereby transmitting the drive force from the main drive gear 410 to the circulation drum unit (second load) 200 on the front side.

The dog clutch key 450 moves axially to be meshed alternately with the respective valleys 432b and 442b of the first dog teeth 432 and the second dog teeth 442 provided on faces opposite to each other of the first transmission gear 430 and the second transmission gear 440, thereby enabling switching transmission of the drive force, by alternately integrating the respective transmission gears with the main drive gear 410.

That is, the dog clutch key 450 is substantially in a rectangular shape, is fitted into the movable support hole 422, which is a long through hole provided in the rotary sleeve, in such a manner that the opposite ends thereof protrude from the movable support hole, and is supported movably in an axial direction. An insertion hole 450a for inserting the fixed shaft 415 so as to be able to move relatively is formed penetrating therethrough in an intermediate part between two opposite end faces of the dog clutch key 450. By inserting the fixed shaft 415 into the insertion hole 450a, the dog clutch key 450 can advance and retreat in the movable support hole 422 in the same posture. That is, since the dog clutch key axially moves along the movable support hole 422, while the posture thereof is steadily guided by the fixed shaft, the dog clutch key can smoothly mesh with the respective dog teeth.

While the main drive gear 410 is fixed to an outer periphery of the rotary sleeve 420 at a first axial end, the first transmission gear 430 is pivotally supported so as to be able to rotate relative to the outer periphery of the rotary sleeve 420 via the bearing member 430a. Further, the second transmission gear 440 is pivotally supported so as to be able to rotate relative to the outer periphery of the rotary sleeve on the second axial direction side via the bearing member 440a.

The rotary sleeve 420 is pivotally supported rotatably at the axial opposite ends by bearing members 475 and 476. The bearing members 475 and 476 are supported by a fixing portion (not illustrated).

As illustrated in FIG. 8, the first transmission gear 430 meshes with one rear-side driven gear 500 located immediately below thereof, to drive another rear-side driven gear 502 integrated therewith via a rear-side drive shaft 501. The rear-side driven gear 502 meshes with another rear-side driven gear 503 illustrated in FIG. 7, to drive an object to be driven in the rear-side circulation drum unit 100.

The second transmission gear 440 meshes with another front-side driven gear 510 illustrated in FIG. 7, to drive an object to be driven in the front-side circulation drum unit 200.

(Activation Mechanism)

Next, a configuration and operations of an activation mechanism 480 that causes the respective transmission gears 430 and 440 to connect with and disconnect from the main drive gear 410, which is directly connected with the motor 302, by the flapper drive mechanism 300 that advances and retreats the pressurizing member 470 to axially move the dog clutch key 450 are described with reference to FIG. 10 and FIG. 12.

That is, the activation mechanism 480 that activates the pressurizing member 470 supported by the fixed shaft 415 so as to be able to advance and retreat axially includes a driven gear portion 352 that is moved rotationally by the pivot shaft 350*a* parallel to the fixed shaft 415 and receives a drive force from the other drive gear portion (in this example, the gear portion 316*a* of the clutch activating piece 316) in a part of the outer periphery, and the cam gear 350 including the cam portion 354, which comes into contact with and activates a cam follower 470*b* provided in the pressurizing member 470, in the other part of the outer periphery. The activation mechanism 480 is characterized such that the cam portion 354 has a shape that axially advances and retreats the cam follower 470*b* in a process in which the cam gear 350 moves rotationally in forward and reverse directions.

FIGS. 12(*a*-1), (*a*-2), and (*a*-3) illustrate a state in which the cam gear 350 (the cam portion 354) is not pressing the pressurizing member 470 because it is in the first posture (a drive force transmission state to the circulation drum unit 100 on the rear side), and FIGS. 12(*b*-1), (*b*-2), and (*b*-3) illustrate a state in which the cam portion 354 is pressing the pressurizing member 470 in the second axial direction because it is in the second posture (a drive force transmission state to the circulation drum unit 200 on the front side).

The pressurizing member (slide bush) 470 is constituted by a cylindrical portion 470*a* inserted into the fixed shaft 415 and a flange (cam follower) 470*b* provided at one end of the cylindrical portion.

The cam portion 354 provided in the cam gear 350 includes a cam surface 354*a* as an inclined surface having a predetermined inclination with respect to the axial direction of the fixed shaft. The cam surface 354*a* has a positional relationship in which the cam surface 354*a* comes in sliding contact with an outer peripheral edge of the flange 470*b* of the pressurizing member 470, and the cam surface 354*a* generates a force to cause the pressuring member to advance or retreat axially via the flange, by pressing or releasing pressure against the flange 470*b* in the process in which the cam gear 350 moves rotationally in forward and reverse directions.

In the state illustrated in FIGS. 12(*a*-1) to (*a*-3), since the cam portion 354 is in the first posture, the cam surface 354*a* does not press the flange 470*b* in the second axial direction, and thus the pressurizing member stops at a position biased toward the first axial direction. Therefore, the first coil spring 460 does not move the dog clutch key 450 in the second axial direction, and the dog clutch key 450 stops at a position biased toward the first axial direction by the second coil spring 465. Accordingly, the dog clutch key can maintain the state meshed with the first dog teeth 432 of the first transmission gear 430 on the rear side.

Since the dog clutch key drives the motor in the state being meshed with the first dog teeth, a drive force is transmitted from the output gear 303 through the main drive gear 410, the rotary sleeve 420, the dog clutch key 450, and the first transmission gear 430. During the rotation, the first and second coil springs do not rotate, or follow the rotation of the rotary sleeve.

In this example, when the cam portion 354 is in the first posture, the pressurizing member does not pressurize the first coil spring at all. However, the pressurizing member may come into contact with the first coil spring or apply pressure lightly to the first coil spring so as not affect the movement of the dog clutch key.

In the state illustrated in FIGS. 12(*b*-1) to (*b*-3), since the cam portion 354 is in the second posture, the cam surface 354*a* presses the flange 470*b* in the second axial direction, and thus the pressurizing member moves in the second axial direction against the first coil spring 460 (while compressing the first coil spring). Therefore, the first coil spring 460 moves the dog clutch key 450 in the second axial direction against the second coil spring 465, and the dog clutch key can maintain the state meshed with the second dog teeth 442 of the second transmission gear 440 on the front side.

Since the dog clutch key drives the motor in the state being meshed with the second dog teeth, a drive force is transmitted from the output gear 303 through the main drive gear 410, the rotary sleeve 420, the dog clutch key 450, and the second transmission gear 440. During the rotation, the first and second coil springs do not rotate, or follow the rotation of the rotary sleeve. In any case, the respective coil springs do not block transmission of a drive force during a period in which the drive force from the motor is being transmitted to either one of the transmission gears.

According to the present embodiment, since the swing solenoid 320 causes the flapper 310 to move rotationally between the first posture indicated by a broken line and the second posture indicated by a solid line in FIG. 5, the pressuring member 470 advances and retreats between a non-pressing position indicated by a solid line in FIG. 9 (FIGS. 12(*a*-1) to (*a*-3) and a pressing position indicated by a broken line in FIG. 9 (FIGS. 12(*b*-1) to (*b*-3)). Since the flapper is an essential component as a transport-direction switching unit of banknotes in a two drum-type banknote storage device, reduction in the number of components, downsizing, and low cost can be realized by also using the operation of the essential component also as means for switching a drive force.

(Measures Against Meshing Failure)

A force for meshing the dog clutch key 450 with the respective dog teeth is basically a pressure from the respective coil springs. However, if the resilience of the respective coil springs decreases due to an increase of sliding resistance of the respective coil springs by wear between the central hole 420*a* of the rotary sleeve and the coil springs over time, the pressure for achieving mesh becomes insufficient, and friction and catch between the dog clutch key and peaks of the respective dog teeth cannot be resolved and the dog clutch key cannot mesh with the respective dog teeth.

That is, in the process in which the dog clutch key 450 advances and retreats in the movable support hole 422 in line with the advance and retreat of the pressurizing member 470, such a situation may occur that the dog clutch key 450 collides with the peaks 432*a* or 442*a* of the dog teeth of either one of the transmission gears 430 and 440, and cannot enter into the valleys 432*b* or 442*b*.

In the present invention, the dog clutch key 450 can rotate relative to the peaks of the respective dog teeth at the timing of initial motion, by driving the motor 302 while maintaining (locking) the posture of the flapper 310 (clutch activating piece 316) so as not to move rotationally, with the swing solenoid 320 being kept in a biased state, thereby enabling to cause the dog clutch key to fall into any of the valleys 432b and 442b immediately.

That is, when the clutch activating piece 316 holds the cam gear 350 in the first posture illustrated in FIG. 12(a-1) and the like, the cam portion 354 does not press the flange 470b and holds the pressurizing member on the first axial direction side. In this state, since the dog clutch key 450 is displaced in the first axial direction within the movable support hole 422 by the force of the second coil spring 465, the dog clutch key 450 is located on the side of the first transmission gear 430. In this stage, even if the dog clutch key 450 collides with the peaks 432a of the dog teeth of the first transmission gear 430 to cause friction and catch so as not to be able to fall into the valleys 432b, by driving the motor 302 while maintaining the cam gear 350 in the first posture, the dog clutch key 450 is rotated by the drive force. Therefore, the dog clutch key 450 can fall into the valleys 432b immediately, thereby preventing that the poor meshing state continues.

Further, when the clutch activating piece 316 holds the cam gear 350 in the second posture illustrated in FIG. 12(b-1) and the like, the cam portion 354 presses the flange 470b to move the pressurizing member to the second axial direction side. In this state, since the dog clutch key 450 is displaced in the second axial direction within the movable support hole 422 by the force of the first coil spring 460, the dog clutch key 450 is located on the side of the second transmission gear 440. In this stage, even if the dog clutch key 450 collides with the peaks 442a of the second dog teeth of the second transmission gear 440 so as not to be able to fall into the valleys 442b, by driving the motor while maintaining the cam gear 350 in the second posture, the dog clutch key 450 is rotated by the drive force. Therefore, the dog clutch key 450 can fall into the valleys 442b immediately.

In this manner, even if the resilience of the respective coil springs decreases due to an increase of sliding resistance of the respective coil springs by wear between the central hole 420a of the rotary sleeve and the coil springs over time, to decrease the force of pressing the dog clutch key against the dog teeth 432 or 442 of respective transmission gears, by continuously pressing the dog clutch key against the dog teeth 432 or 442 of each transmission gear while maintaining the posture of the cam gear 350 in a state in which the swing solenoid is biased continuously, the dog clutch key can fit into the valleys 432b or 442b together with the rotation of the respective transmission gears, thereby enabling to prevent the dog clutch key from detaching from the respective valleys.

If it is prevented that the force of pressing the dog clutch key against the dog teeth of the respective transmission gears decreases over time by improving the spring load of the coil springs, the resilience of the coil springs excessively increases so that the cam gear 350 constituting the activation mechanism is returned in a reverse direction to change the posture of the flapper, or causes a problem such that malfunction is caused due to insufficient torque of the swing solenoid. Therefore, it is not a favorable idea.

According to the present invention, even if a spring load of the coil spring decreases, mesh between the dog clutch key and the respective dog teeth can be achieved smoothly by continuously biasing the swing solenoid to lock the state of the activation mechanism in a predetermined state continuously, without increasing the spring load of the coil spring.

(Configuration Example of Circulation Drum Unit)

A configuration of the drive mechanism that realizes the above operation of the circulation drum and the bobbin in the circulation drum units 100 and 200 is described. Since the configuration of the circulation drum units 100 and 200 are the same (substantially bilaterally symmetrical), only the first circulation drum unit 100 is described here.

Figure 13:
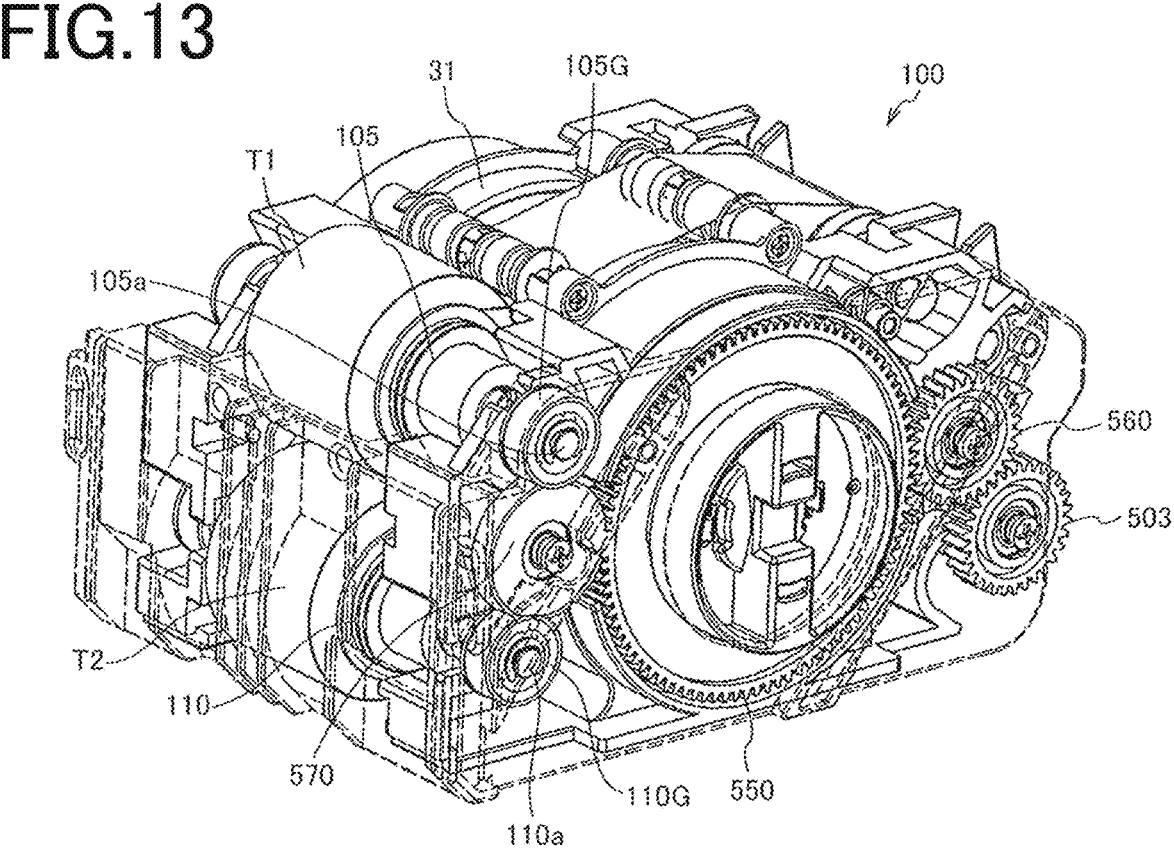
FIG. 13 is a perspective view of a first circulation drum unit including a gear train that drives a circulation drum and respective bobbins.

FIG. 13 is a perspective view of the first circulation drum unit 100 including a gear train that drives the circulation drum 31 and the respective bobbins 105 and 110.

A drum gear 550 having a large diameter is coaxially integrated with one side surface of the circulation drum 31, and the rear-side driven gear 503 illustrated in FIG. 7 transmits a drive force to the drive gear 550 via a driven gear 560.

Each of bobbin gears 105G and 110G is pivotally supported at ends of rotation shafts 105a and 110a of the first bobbin 105 and the second bobbin 110 via a one-way clutch (not illustrated), and a relay gear 570 that is meshed with the drum gear 550 at all times meshes with the both bobbin gears 105G and 110G at all times. When the drum gear 550 rotates in a clockwise direction for winding the both tapes T1 and T2 with respect to the respective bobbin gears coupled with the rotation shafts 105a and 110a of the respective bobbins via the one-way clutch, drive from the first bobbin gear 105 and the second bobbin gear 110 is not transmitted to the respective rotation shafts 105a and 110a (respective bobbins) due to the action of the one-way clutch. That is, when the respective tapes are to be pulled out by rotating the circulation drum 31 in a winding direction, pullout of the tapes is permitted, while the respective bobbins 105 and 110 in a free state rotate together with the tapes.

Further, when the drum gear 550 rotates in a counterclockwise direction for feeding the both tapes T1 and T2, drive from the first bobbin gear 105 and the second bobbin gear 110 is transmitted to the respective rotation shafts 105a and 110a (respective bobbins) due to the action of the one-way clutch. That is, when the respective tapes are to be fed out by rotating the circulation drum 31 in a feeding direction, the bobbins 105 and 110 are driven in a winding direction by the respective bobbin gears, to wind the tapes.

Detailed configurations other than those described above, for example, a configuration for preventing deflection of a tape is not relevant to the main subject of the present invention, and thus descriptions thereof are omitted.

<Storage and Payout Procedures by Circulation-Type Banknote Processing Device>

Figure 14:
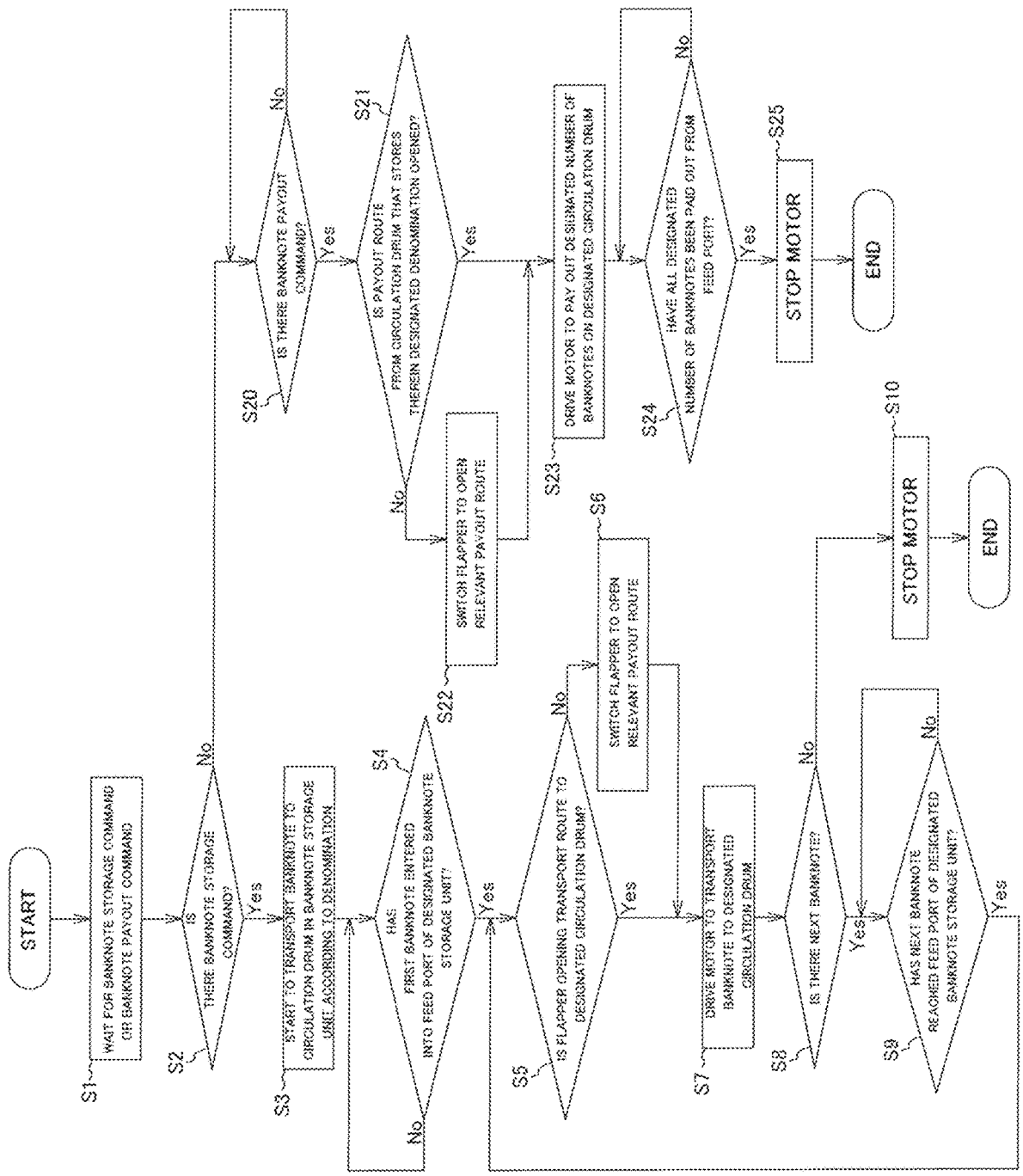
FIG. 14 is a flowchart of storage and payout procedures by the circulation-type banknote processing device.

Next, storage and payout procedures by the circulation-type banknote processing device are described with reference to a flowchart in FIG. 14.

In the flowchart, it is assumed that there is a space for storing a new banknote in all the circulation drums at the time of storing the banknotes, and a necessary number of banknotes of a designated denomination are stored in all the circulation drums at the time of paying out the banknotes. Further, the denomination of the banknote to be stored in each of the circulation drums is determined beforehand, and pieces of information relating to, for example, the denomination and the number of banknotes, and the circulation drum to store the banknotes are included in a banknote storage command from the control unit. Further, pieces of information relating to, for example, the denomination and the number of banknotes to be paid out, and the circulation drum to pay out the banknotes are included in a banknote payout command.

At Step S1, the circulation-type banknote storage unit waits for a banknote storage command or a banknote payout command. When an acceptance condition is satisfied such that a first banknote input from the input/output port 5 illustrated in FIG. 1 by a customer is authentic, the control unit outputs a banknote storage command, designates a circulation drum corresponding to the denomination of the first banknote, for example, the first circulation drum 31, and transports the banknote from the deposit and withdrawal processing unit M toward the banknote storage unit N by driving the transport mechanism (YES at Step S2, and Step S3).

Next, when a paper feed sensor (not illustrated) arranged in the feed port 60*a* of the circulation-type banknote storage unit 30 installed with the first circulation drum 31 detects entrance of the first banknote (YES at Step S4), the control unit confirms whether the flapper 310 is in the first posture in which a route advancing toward the first circulation drum 31 is opened based on an output of the detection sensor 360 at Step S5. When the flapper 310 is in the first posture (YES at Step S5), the control unit drives the motor 302 in a normal rotation direction to rotate the first circulation drum 31 in a winding direction, and rotates the respective bobbins 105 and 110 in a feeding direction, thereby stacking the first banknote on the outer periphery of the first circulation drum while placing the first banknote between the tapes T1 and T2 (Step S7).

When the flapper 310 is in the first posture, since the clutch activating piece 316 integrated with the flapper holds the cam gear 350 in the first posture by the swing solenoid 320, the pressuring member 470 is at a non-pressurizing position illustrated in FIG. 12(*a*) and at a non-pressurizing position indicated by a broken line in FIG. 9 and FIG. 10, and the dog clutch key 450 meshes with the first dog teeth of the first transmission gear 430. Therefore, a drive force from the motor 302 is transmitted to the first circulation drum unit 100 (the drive mechanism of the first circulation drum 31) via the first transmission gear 430.

At Step S5, when the flapper is not in the first posture, the control unit activates the flapper drive mechanism 300 to move the flapper rotationally from the second posture to the first posture (Step S6). It is judged that the flapper is switched to the first posture by an output of the detection sensor 360.

In a case in which the second circulation drum 35 is designated as a storage destination in the banknote storage command output at Step S2, when the paper feed sensor arranged in the feed port 60*a* of the circulation-type banknote storage unit 30 installed with the second circulation drum 35 has detected entrance of the first banknote (YES at Step S4), it is confirmed whether the flapper 310 is in the second posture in which a route advancing toward the second circulation drum 35 is opened at Step S5. When the flapper 310 is in the second posture, the control unit drives the motor 302 in a normal rotation direction to rotate the second circulation drum 35 in a winding direction, and rotates the respective bobbins 205 and 210 in a feeding direction, thereby stacking the first banknote on the outer periphery of the second circulation drum while placing the first banknote between the tapes T3 and T4 (Step S7). When the flapper 310 is in the second posture, since the clutch activating piece 316 integrated with the flapper holds the cam gear 350 in the second posture by the swing solenoid 320, the pressuring member 470 is at a pressurizing position illustrated in FIGS. 12(*b*-1) to (*b*-3) and at a pressurizing position indicated by a solid line in FIG. 9 and FIG. 10, and the dog clutch key 450 meshes with the second dog teeth of the second transmission gear 440. Therefore, the drive force from the motor 302 is transmitted to the second circulation drum unit 200 (the drive mechanism of the second circulation drum 35) via the second transmission gear 440.

At Step S5, when the flapper is not in the second posture, the control unit activates the flapper drive mechanism 300 to move the flapper rotationally from the first posture to the second posture (Step S6).

By performing the procedures at Step S5 and thereafter for all the subsequent input banknotes, when storage of all the banknotes has completed, the motor is stopped to end the flow (Steps S7 to 10).

Next, at Step S2, when the banknote storage command is not output, it is checked whether there is a banknote payout command at Step S20, and when the control unit outputs a banknote payout command, it is checked at Step S21 whether a payout route (discharge route) from the circulation drum (for example, the first circulation drum 31) that stores the denomination designated in the banknote payout command is opened (whether the flapper is in the first posture). When the payout route is being opened, control proceeds to Step S23.

At Step S21, when the flapper is not in the first posture, the control unit moves the flapper rotationally from the second posture to the first posture by activating the flapper drive mechanism 300 (Step S22).

At Step S21, when the payout route from the first circulation drum 31 to the feed port 60*a* is being opened (the flapper is in the first posture), the control unit drives the motor 302 in a reverse rotation direction, to rotate the first circulation drum 31, which is in a state connected with the motor, in a feeding direction by the drive transmission switching mechanism 400, and rotates the respective bobbins 105 and 110 in a winding direction, thereby sequentially feeding out the banknotes placed between the tapes T1 and T2 from the outer periphery of the first circulation drum by a designated number of banknotes (Step S23). The number of banknotes paid out is counted by the paper feed sensor at the feed port 60*a*.

When the flapper 310 is in the first posture, since the clutch activating piece 316 integrated with the flapper holds the cam gear 350 in the first posture by the swing solenoid 320, the pressuring member 470 is at the non-pressurizing position illustrated in FIG. 12(*a*) and at the non-pressurizing position indicated by the broken line in FIG. 9 and FIG. 10, and the dog clutch key 450 meshes with the first dog teeth of the first transmission gear 430. Therefore, the drive force from the motor 302 is transmitted only to the first circulation drum unit 100 (the drive mechanism of the first circulation drum 31) via the first transmission gear 430.

At Step S21, when the flapper is not in the first posture, the control unit activates the flapper drive mechanism 300 to move the flapper rotationally from the second posture to the first posture (Step S22).

When the denomination designated for payout is stored in the second circulation drum 35, the control unit confirms whether the flapper 310 is in the second posture to open the route connecting the second circulation drum 35 with the feed port 60*a*. When the flapper 310 is in the second posture, the control unit drives the motor 302 in a reverse rotation direction to rotate the second circulation drum 35 in a feeding direction, and rotates the respective bobbins 205 and 210 in a winding direction to sequentially pay out the banknotes being placed between the both tapes in the process of feeding the tapes T3 and T4 from the second circulation drum up to a designated number of banknotes (Step S23). When the flapper 310 is in the second posture, since the clutch activating piece 316 integrated with the flapper holds the cam gear 350 in the second posture by the swing solenoid 320, the pressuring member 470 is at the pressurizing position illustrated in FIGS. 12(b-1) to (b-3) and at the pressurizing position indicated by the solid line in FIG. 9 and FIG. 10, and the dog clutch key 450 meshes with the second dog teeth of the second transmission gear 440. Therefore, the drive force from the motor 302 is transmitted to the second circulation drum unit 200 (the drive mechanism of the second circulation drum 35) via the second transmission gear 440.

At Step S24, it is judged that the payout operation at Step S23 has been performed for all the banknotes based on the number of banknotes discharged from the feed port 60a, and upon completion of discharge, the motor is stopped to end the flow (Step S25).

[Summary of Configurations, Actions, and Effects of Present Invention]

The paper sheet storage unit according to the first invention includes the single motor 302, the first circulation unit 100 and the second circulation unit 200 that respectively receive a transported paper sheet by operating upon reception of a drive force from the motor and feed the stored paper sheet, the drive transmission switching mechanism 400 that selectively switches and transmits a drive force from the motor to either one of the circulation units, the sorter 310 that sorts the transported paper sheet to either one of the circulation units by changing the posture thereof, and the sorter drive mechanism 300 that drives the sorter. The configuration is characterized such that the drive transmission switching mechanism is activated by changing the posture of the sorter by the sorter drive mechanism, to switch and transmit the drive force from the motor to either one of the circulation units.

Drive of the circulation unit is generally performed by one motor for one circulation unit. However, according to the present invention, by adopting the drive transmission switching mechanism, the two circulation units that accommodate banknotes of a denomination different from each other can be driven by one motor, thereby decreasing the number of motors. Due to the reduction in the number of motors, the hardware configuration is simplified to realize cost reduction, and software control can be also simplified. The circulation unit is not limited to the circulation drum type described in the embodiment, and includes all sorts of units that can accommodate and pay out paper sheets in a circulating manner without using a drum or a tape.

The sorter 310 is a unit that switches the transport route and the transport direction of paper sheets fed from the feed port 60a of the paper sheet storage devices 30 and 40 to either one of the circulation units. The paper sheet paid out from the respective circulation units is guided to the feed port by the sorter. At the time of reciprocating the sorter within a predetermined angular range, the drive transmission switching mechanism 400 is activated to perform switching of the transmission direction of the drive force simultaneously.

In this manner, in the circulation-type paper sheet storage unit of a type including two circulation units, switching of a drive force to respective circulation units can be realized by using the sorter for switching the transport route.

The drive transmission switching mechanism according to the second invention is the drive transmission switching mechanism 400 that switches and transmits a drive force from the single motor 302 selectively to either one of a first load (in the embodiment, the first circulation drum unit 100) and a second load (in the embodiment, the second circulation drum unit 200). The drive transmission switching mechanism 400 includes the main drive gear 410 driven to be rotated upon reception of a drive force from the output gear 303 of the motor, the fixed shaft 415 that pivotally supports a shaft hole of the main drive gear so as to be able to rotate via the rotary sleeve 420, the rotary sleeve 420 that is supported immovably in an axial direction but so as to be able to rotate relative to the fixed shaft inserted into the central hole 420a, and fixedly supports the shaft core (a shaft hole) of the main drive gear, the first transmission gear 430 in which a shaft hole is pivotally supported so as to be able to rotate relative to the rotary sleeve portion (outer periphery) on the second axial direction side of the main drive gear, to transmit the drive force to the first load side, the second transmission gear 440 in which a shaft hole is pivotally supported so as to be able to rotate relative to the rotary sleeve portion (outer periphery) on the second axial direction side of the first transmission gear, to transmit the drive force to the second load side, and the first dog teeth 432 and the second dog teeth 442 provided on surfaces opposite to each other of the first transmission gear and the second transmission gear. Further, the drive transmission switching mechanism 400 includes the dog clutch key 450 that is supported axially movably by the rotary sleeve portion located between the first transmission gear and the second transmission gear and meshes with the first dog teeth when located at a position biased toward the first axial direction, and meshes with the second dog teeth when located at a position biased toward the second axial direction, the first resilient member 460 arranged between the rotary sleeve portion on the second axial direction side than the dog clutch key and the fixed shaft, the second resilient member 465 arranged between the rotary sleeve portion on the second axial direction side than the dog clutch key and the fixed shaft, and the pressurizing member 470 inserted into a gap between the outer periphery of the fixed shaft and the central hole of the rotary sleeve from the second axial direction side to press the dog clutch key against the second transmission gear via the first resilient member. The configuration is characterized such that when the pressurizing member is not pressing the first resilient member (or is not pressing the first resilient member with a force equal to or larger than a predetermined value), the dog clutch key meshes with the first dog teeth of the first transmission gear by the second resilient member, to transmit the drive force from the main drive gear to the first load. When the pressurizing member presses the first resilient member, the dog clutch key meshes with the second dog teeth of the second transmission gear, to transmit the drive force from the main drive gear to the second load.

If the two loads (objects to be driven) are driven each by one motor, the number of components increases, the hardware configuration becomes complicated, and software control also becomes complicated, thereby increasing the cost.

According to the present invention, by enabling to drive two loads by one motor, the hardware configuration and software control are simplified by reducing the number of motors, thereby enabling to realize cost reduction. Further, since the transmission direction of a drive force can be switched by using the operation of essential components (for example, the paper sheet transport direction switching unit in the two drum-type paper sheet storage device) in the device in which two loads are driven by one motor, reduction of the number of components, downsizing, and low cost can be realized.

While the drive force from the motor is transmitted to the main drive gear integrated with the rotary sleeve, the first and second transmission gears are supported rotatably relative to the rotary sleeve. The dog clutch configured to be able to move axially by the rotary sleeve and rotate integrally with the rotary sleeve meshes selectively with one of the transmission gears by advancing or retreating axially, to cause the one transmission gear to be integrated with the rotary sleeve temporarily, thereby enabling to transmit the drive force. As means for activating the dog clutch, the pressurizing member is used and the pressurizing member is activated by the activation mechanism.

As a load to become a switching target of the drive force transmission, it is not limited to the paper sheet storage device described in the embodiment, and any kind of targets can be assumed. It is not always necessary to support the pressurizing member by the fixed shaft so as to be able to advance and retreat, and any support structure can be used.

The drive transmission switching mechanism 400 according to the third invention includes the activation mechanism 480 that activates the pressurizing member 470. The activation mechanism includes the driven gear portion 352 that is moved rotationally by a pivot shaft parallel to the fixed shaft and receives a drive force from another drive gear member 316 in one part of the outer periphery thereof, and the cam gear 350 including the cam portion 354 that activates the pressurizing member by coming into contact with the cam follower 470b provided in the pressuring member to rotate, in the other part of the outer periphery. The activation mechanism is characterized such that the cam portion has a shape so as to advance and retreat the pressurizing member in an axial direction via the cam follower in a process in which the cam gear moves rotationally in forward and reverse directions.

As the activation mechanism for biasing the first resilient member by advancing and retreating the pressurizing member in a gap between the external surface of the fixed shaft and the rotary sleeve, for example, the cam gear 350 that operates upon reception of a drive force from the other drive gear member 316 can be used. Accordingly, the activation mechanism can be established only by adding a simple component to an existing component (a flapper).

The paper sheet storage units 30 and 40 according to the fourth invention include the drive transmission switching mechanism 400. The configuration is characterized such that the first and second loads are respectively the circulation drum units 100 and 200 that receive and accommodate a paper sheet sorted by the sorter 310 respectively in a process of being transported, and the cam gear 350 is moved rotationally in forward and reverse directions via the driven gear portion by moving the sorter rotationally in forward and reverse directions, to move the drive gear member rotationally in forward and reverse directions.

Drive of the circulation drum of a tape (film) winding type is generally performed by one motor for one circulation drum. However, according to the present invention, by adopting the drive transmission switching mechanism, the two circulation drums that accommodate banknotes of a denomination different from each other can be driven by one motor, thereby decreasing the number of motors. Due to the reduction in the number of motors, the hardware configuration is simplified to realize cost reduction, and software control can be also simplified.

The sorter 310 is a unit that switches a paper sheet fed from the feed port 60a of the paper sheet storage devices 30 and 40 to either one of the circulation drum units. When the sorter is reciprocally moved within an angular range of, for example, 20 degrees by the swing solenoid, switching of the transmission direction of the drive force is simultaneously performed.

In this manner, switching of a drive force to each circulation-type drum unit can be realized by using a sorter for switching a transport route, which has been conventionally used in a two drum-type circulation-type paper sheet storage unit.

The paper sheet processing device according to the fifth invention is characterized such that the paper sheet storage unit is provided.

According to the paper sheet processing device, it is possible to drive a paper sheet storage unit including two loads by one motor, thereby obtaining an advantage of simplifying and downsizing the configuration, reducing the cost, and the like.

REFERENCE SIGNS LIST 1 banknote processing device, 3 housing, 5 input/output port, 7 return port, 9a stored-banknote transport route, 9b stored-banknote transport route, 11 collective deposit unit, 13 centering unit, 15 recognition unit, 20 escrow unit, 21 escrow drum, 22 stacking unit, 23 payout drum, 30, 40 circulation-type banknote storage unit (circulation-type banknote storage device), 31, 35 circulation drum, 31a drum shaft, 41, 45 circulation drum, 50 collection box, 60 casing, 60a feed port, 61 casing body, 62 top panel, 63 side plate, 63a opened portion, 63b side plate lid, 70 rear-side feed route (transport route), 72, 74 transport mechanism, 72a belt, 72b roller, 74a belt, 80 front-side feed route (transport route), 100 first circulation drum unit (first circulation unit), 105, 110 bobbin, 106a to 106c guide roller, 111a to 111d guide roller, T1, T2, T3, T4 tape, 200 second circulation drum unit (second circulation unit), 205, 210 bobbin, 206a to 206d guide roller, 211a to 211c guide roller, 300 flapper drive mechanism (sorter drive mechanism), 302 motor, 303 output gear, 310 flapper, 310a claw, 312 pivot shaft, 312 drive shaft, 315 protruding piece, 316 clutch activating piece, 316a gear portion, 320 swing solenoid, 350 cam gear, 350a shaft portion, 352 driven gear portion, 354 cam portion, 354a cam surface, 356 douser, 360 detection sensor, 400 drive transmission switching mechanism, 410 main drive gear, 415 fixed shaft, 420 rotary sleeve, 420a central hole, 422 movable support hole, 430 first transmission gear, 430a bearing member, 440 second transmission gear, 432, 442 dog teeth, 432a, 442a peak, 432b, 442b valley, 440a bearing member, 450 dog clutch key, 450a insertion hole, 460 first coil spring (first resilient member), 465 second coil spring (second resilient member), 470 pressurizing member, 470a cylindrical portion, 470b flange (cam follower), 475, 476 bearing member, 480 (350, 352, 354) activation mechanism, 500 rear-side driven gear, 501 rear-side drive shaft, 502 rear-side driven gear, 503 rear-side driven gear, 510 front-side driven gear, 520 drive mechanism, 525 drum gear, 1000 control unit

The invention claimed is:

1. A drive transmission switching mechanism that switches and transmits a drive force from a single motor selectively to either one of a first load and a second load, the drive transmission switching mechanism comprising:
    a main drive gear driven to be rotated upon reception of
        a drive force from an output gear of the motor;

a fixed shaft that pivotally supports the main drive gear so as to be able to rotate via a rotary sleeve;

the rotary sleeve that is supported so as to be able to rotate relative to the fixed shaft inserted into a central hole thereof and fixedly supports a shaft core of the main drive gear;

a first transmission gear that transmits a drive force toward the first load, with a shaft hole being pivotally supported so as to be able to rotate relative to the rotary sleeve on a second axial direction side of the main drive gear;

a second transmission gear that transmits the drive force to the second load, with a shaft hole being pivotally supported so as to be able to rotate relative to the rotary sleeve biased toward a second axial direction of the first transmission gear;

first dog teeth and second dog teeth each provided on opposite surfaces of the first transmission gear and the second transmission gear;

a dog clutch key that is supported axially movably by the rotary sleeve portion located between the first transmission gear and the second transmission gear and meshes with the first dog teeth when located at a position biased toward a first axial direction, and meshes with the second dog teeth when located at a position biased toward the second axial direction;

a first resilient member arranged between the rotary sleeve located closer to the first axial direction than the dog clutch key and the fixed shaft, and a second resilient member arranged between the rotary sleeve located closer to the second axial direction than the dog clutch key and the fixed shaft; and a pressurizing member inserted into a gap between an outer periphery of the fixed shaft and a central hole of the rotary sleeve from the first axial direction to press the dog clutch key against the second transmission gear via the first resilient member, wherein when the pressurizing member is not pressing the first resilient member, or is not pressing the first resilient member with a force equal to or larger than a predetermined value, the dog clutch key meshes with the first dog teeth of the first transmission gear by the second resilient member, to transmit the drive force from the main drive gear to the first load, and when the pressurizing member presses the first resilient member, the dog clutch key meshes with the second dog teeth of the second transmission gear, to transmit the drive force from the main drive gear to the second load.

2. The drive transmission switching mechanism according to claim 1, further comprising an activation mechanism that activates the pressurizing member, wherein the activation mechanism is moved rotationally by a pivot shaft parallel to the fixed shaft, and includes a driven gear portion that receives a drive force from another drive gear member, and a cam gear including a cam portion that activates the pressurizing member by coming into contact with a cam follower provided in the pressurizing member to rotate, and the cam portion has a shape so as to advance and retreat the pressurizing member in an axial direction via the cam follower in a process of moving rotationally in forward and reverse directions.

3. A paper sheet storage unit comprising the drive transmission switching mechanism according to claim 2, wherein the first and second loads are respectively a circulation drum unit that receives and accommodates a paper sheet sorted by a sorter respectively in a process of being transported, and the cam gear is moved rotationally in forward and reverse directions via the driven gear portion, by moving the sorter rotationally in forward and reverse directions to move the drive gear member rotationally in forward and reverse directions.

4. A paper sheet processing device comprising the paper sheet storage unit according to claim 3.

* * * * *

UNITED STATES PATENT AND TRADEMARK OFFICE
CERTIFICATE OF CORRECTION

PATENT NO. : 11,580,809 B2
APPLICATION NO. : 17/040386
DATED : February 14, 2023
INVENTOR(S) : Keiichi Togano et al.

It is certified that error appears in the above-identified patent and that said Letters Patent is hereby corrected as shown below:

In the Claims

Claim 1, Column 23, Line 21, after the word "sleeve" please delete the word "portion".

Signed and Sealed this
Eighteenth Day of April, 2023

Katherine Kelly Vidal
*Director of the United States Patent and Trademark Office*